(12) United States Patent
Ould-Brahim et al.

(10) Patent No.: US 9,231,838 B2
(45) Date of Patent: Jan. 5, 2016

(54) METHOD AND APPARATUS FOR DETECTING AND LOCATING NETWORK CONNECTION FAILURES

(75) Inventors: Djamel Ould-Brahim, Kanata (CA); Terry Bush, Parker, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 660 days.

(21) Appl. No.: 13/292,486

(22) Filed: Nov. 9, 2011

(65) Prior Publication Data
US 2013/0114402 A1 May 9, 2013

(51) Int. Cl.
*H04L 12/28* (2006.01)
*H04L 12/26* (2006.01)
*H04L 12/24* (2006.01)
*H04J 1/16* (2006.01)

(52) U.S. Cl.
CPC .......... *H04L 43/0811* (2013.01); *H04L 41/06* (2013.01); *H04L 41/0663* (2013.01)

(58) Field of Classification Search
USPC .................................. 370/252, 216, 241, 329
See application file for complete search history.

(56) References Cited

U.S. PATENT DOCUMENTS 8,014,275 B1 *  9/2011  Sundt ................. H04L 41/0668
                                                                      370/217
2007/0180105 A1   8/2007  Filsfils

* cited by examiner

*Primary Examiner* — John Pezzlo

(57) ABSTRACT

In one aspect, the present invention addresses Layer-3 (L3) connection monitoring between two "multi-attached" host nodes that are interconnected via an intervening communication network having a known network topology. The present invention provides the two-fold benefit of rapid connection failure detection and failure location determination. In one or more embodiments, the present invention "pinpoints" the failure location, improving the intelligence of any triggered failure recovery mechanism and/or providing better, more meaningful failure reporting. A BFD session is established between the local and remote host nodes for each L3 communication path between them, e.g., for each unique pairing of local and remote network attachment points. Upon the occurrence of an L3 connection failure, the pattern of up/down states for these BFD sessions is analyzed, along with knowledge of the involved network topology, to determine the apparent location of the L3 connection failure.

18 Claims, 36 Drawing Sheets

| Failure Scenario | | | Applicable Case # for Node 1 | | | Applicable Case # for Node 2 | | |
|---|---|---|---|---|---|---|---|---|
| First failure | Second Link | Third Link | Case # | | Fig. # | Case # | | Fig. # |
| A to DHA | None | | 1 | if Network interface A DOWN | 7.1 | 26 | | 9.3 |
| | | | 2 | if link DHA to Network DOWN or DHA L3 routing issue | | | | |
| | | | 3 | if DHA L3 routing issue | | | | |
| | B to DHB | None | 7 | | 7.2 | 4 | | 7.2 |
| | | C to DHC | 7 | | 7.2 | 5 | | 7.2 |
| | | D to DHD | 7 | | 7.2 | 5 | | 7.2 |
| | C to DHC | None | 8 and 11 | if Network interface A DOWN | 7.3 | 8 and 12 | if Network interface C DOWN | 7.3 |
| | | | 9 and 11 | if link DHA to Network DOWN or DHA L3 routing issue | | 9 and 12 | if link DHC to Network DOWN or DHC L3 routing issue | |
| | | | 10 and 11 | if DHA L3 routing issue | | 10 and 12 | if DHC L3 routing issue | |
| | | D to DHD | 6 | | 7.2 | 7 | | 7.2 |
| | D to DHD | None | 8 and 12 | if Network interface A DOWN | 7.3 | 20 and 24 | if Network interface D DOWN | 9.2 |
| | | | 9 and 12 | if link DHA to Network DOWN or DHA L3 routing issue | | 21 and 24 | if link DHD to Network DOWN or DHD L3 routing issue | |
| | | | 10 and 12 | if DHA L3 routing issue | | 22 and 24 | if DHD L3 routing issue | |

*FIG. 10-1*

| Failure Scenario | | | Applicable Case # for Node 1 | | | Applicable Case # for Node 2 | | |
|---|---|---|---|---|---|---|---|---|
| First failure | Second Link | Third Link | Case # | | Fig. # | Case # | | Fig. # |
| B to DHB | None | | 15 | if Network interface B DOWN | 8.2 | 26 | | 9.3 |
| | | | 16 | if link DHB to Network DOWN or DHB L3 routing issue | | | | |
| | | | 17 | if DHB L3 routing issue | | | | |
| | C to DHC | None | 20 and 23 | if Network interface B DOWN | 9.2 | 8 and 12 | if Network interface C DOWN | 7.3 |
| | | | 21 and 23 | if link DHB to Network DOWN or DHB L3 routing issue | | 9 and 12 | if link DHC to Network DOWN or DHC L3 routing issue | |
| | | | 22 and 23 | if DHB L3 routing issue | | 10 and 12 | if DHC L3 routing issue | |
| | | D to DHD | 5 | | 7.2 | 7 | | 7.2 |
| | D to DHD | None | 20 and 24 | if Network interface B DOWN | 9.2 | 20 and 24 | if Network interface D DOWN | |
| | | | 21 and 24 | if link DHB to Network DOWN or DHB L3 routing issue | | 21 and 24 | if link DHD to Network DOWN or DHD L3 routing issue | |
| | | | 22 and 24 | if DHB L3 routing issue | | 22 and 24 | if DHD L3 routing issue | |
| C to DHC | None | | 25 | | | 1 | if Network interface C DOWN | |
| | | | | | | 2 | if link DHC to Network DOWN or DHC L3 routing issue | |
| | | | | | | 3 | if DHC L3 routing issue | |
| | D to DHD | None | 4 | | 7.2 | 7 | | 7.2 |

*FIG. 10-2*

| Failure Scenario | | | Applicable Case # for Node 1 | | Applicable Case # for Node 2 | | |
|---|---|---|---|---|---|---|---|
| First failure | Second Link | Third Link | Case # | Fig. # | Case # | | Fig. # |
| D to DHD | None | | 26 | 9.3 | 15 | if Network interface D DOWN | 8.2 |
| | | | | | 16 | if link DHD to Network DOWN or DHD L3 routing issue | |
| | | | | | 17 | if DHD L3 routing issue | |

FIG. 10-3

| BFD STATUS | | | | APPLICABLE FAILURE SCENARIO | APPLICABLE CASE # IN FIG.12 – 14 | |
|---|---|---|---|---|---|---|
| A – C | A – D | B – C | B – D | | CASE # | FIG # |
| UP | UP | UP | UP | NO FAILURE | N/A | N/A |
| UP | DOWN | UP | UP | ONE ACTIVE BFD SESSION RESET | 15 | 14-1 |
| UP | UP | DOWN | UP | ONE BFD SESSION RESET | 10 | 13-1 |
| UP | UP | UP | DOWN | ONE BFD SESSION RESET | 11 | 13-1 |
| UP | DOWN | DOWN | UP | BRIDGE LINK DOWN | 21 | 14-3 |
| UP | UP | DOWN | DOWN | BACKUP LINK DOWN | 12 / 13 | 13-2 |
| UP | DOWN | DOWN | DOWN | BACKUP LINK DOWN AND REMOTE LINK DOWN | 16 + 17 | 14-2 |
| | | | | BACKUP LINK DOWN AND BRIDGE LINK DOWN | 16 + 17 | |
| | | | | BACKUP LINK DOWN AND REMOTE LINK DOWN AND BRIDGE LINK DOWN | 16 + 17 | |
| | | | | REMOTE LINK DOWN AND BRIDGE LINK DOWN | 18 | |
| UP | DOWN | UP | DOWN | REMOTE LINK DOWN | 20 | 13-2 |

*FIG. 15A*

| | | | | | | |
|---|---|---|---|---|---|---|
| DOWN | UP | UP | UP | ONE ACTIVE BFD SESSION RESET | 14 | 14-1 |
| DOWN | DOWN | UP | UP | ACTIVE LINK DOWN | 1 / 2 | 12-1 |
| DOWN | UP | DOWN | UP | REMOTE LINK DOWN | 19 | 14-3 |
| DOWN | UP | UP | DOWN | BRIDGE LINK DOWN | 21 | 14-3 |
| DOWN | DOWN | DOWN | UP | ACTIVE LINK DOWN AND REMOTE LINK DOWN | 7 + 8 | 12-3 |
| | | | | ACTIVE LINK DOWN AND BRIDGE LINK DOWN | 7 + 8 | |
| | | | | ACTIVE LINK DOWN AND REMOTE LINK DOWN AND BRIDGE LINK DOWN | 7 + 8 | |
| | | | | REMOTE LINK DOWN AND BRIDGE LINK DOWN | 9 | |
| DOWN | UP | DOWN | DOWN | BACKUP LINK DOWN AND REMOTE LINK DOWN | 16 + 17 | 14-2 |
| | | | | BACKUP LINK DOWN AND BRIDGE LINK DOWN | 16 + 17 | |
| | | | | BACKUP LINK DOWN AND REMOTE LINK DOWN AND BRIDGE LINK DOWN | 16 + 17 | |
| | | | | REMOTE LINK DOWN AND BRIDGE LINK DOWN | 18 | |
| DOWN | DOWN | UP | DOWN | ACTIVE LINK DOWN AND REMOTE LINK DOWN | 7 + 8 | 12-3 |

FIG. 15B

| | | | | ACTIVE LINK DOWN AND BRIDGE LINK DOWN | 7+8 | |
|---|---|---|---|---|---|---|
| | | | | ACTIVE LINK DOWN AND REMOTE LINK DOWN AND BRIDGE LINK DOWN | 7+8 | |
| | | | | REMOTE LINK DOWN AND BRIDGE LINK DOWN | 9 | |
| DOWN | DOWN | DOWN | DOWN | LOCAL NODE ISOLATION | 6 | 12-2 |
| | | | | REMOTE NODE ISOLATION | 3/4/5 | |

(*) "/" MEANS "OR"
"+" MEANS "AND"

*FIG. 15C*

METHOD AND APPARATUS FOR DETECTING AND LOCATING NETWORK CONNECTION FAILURES

TECHNICAL FIELD

The present invention generally relates to network-layer communications between interconnected host nodes, such as, for example, but not limited to, between an eNodeB and a Media Gateway Controller in the core of a wireless communication network, and particularly relates to identifying the apparent location of connection failures between multi-attached host nodes.

BACKGROUND

Rapid detection and recovery of communication failures represents a useful feature for any network system, but the need for such capability is particularly acute for certain types of networks and certain types of traffic, such as voice traffic and other types of "bearer" traffic. Correspondingly, there are a number of known techniques for testing the "liveness" of communication links.

Some of these techniques particularly apply to Open System Interconnect (OSI) Layer 3 connections over any OSI Layer 2 data link layer or media (e.g., Ethernet, ATM, etc.). Specific examples include the relatively simple Layer 3 Internet Control Message Protocol (ICMP) Echo Request messages, which are sent at regular intervals of time to an adjacent node or router, to more elaborate solutions, such as the Open Shortest Path First (OSPF) routing protocol. However, these solutions do not in a general sense provide fast and reliable monitoring of the end-to-end Layer 3 (L3) connection between local and remote host nodes that are interconnected through a communication network, such as an IP network that includes multiple routing hops between the host nodes. Here, one may note that an end-to-end L3 path may include, and often does include, multiple L3 segments, going from one hop to the next. Here, a "hop" can be either a router or a switch, for example.

In what may be understood as a more robust mechanism for end-to-end monitoring of L3 connectivity, the Internet Engineering Task Force (IETF) developed the "Bidirectional Forwarding Detection" protocol, which is referred to as BFD and is detailed in the Request for Comments (RFC) 5880. Additional RFCs of interest include RFC5881, '5882, '5883, and '5884. RFC5881 relates to single-hop connectivity, while RFC5883 relates to multi-Hop connectivity and defines the usage of the BFD protocol over an IPv4 or an IPv6 network.

As one of its several advantages, the BFD protocol provides a connectivity detection mechanism that can be used for connectivity detection over any media, at any protocol layer, and with a wide range of detection times (as small as 50 ms or less) and overhead control. In an example of BFD-based connectivity monitoring, see the U.S. Patent Publication 2007/0180105 A1 (2 Aug. 2007), which discloses the use of BFD for distinguishing between link and node failures.

More broadly, BFD may be understood as offering low overhead and rapid detection of connection failures. BFD also provides flexibility because it works over any type of Layer 2 media, including Layer 2 media types that do not inherently support strong failure detection, such as Ethernet, virtual circuits, tunnels, and Multi-Protocol Label Switched (MPLS) paths. However, BFD and the other connection failure detection protocols do not in and of themselves provide any mechanism for determining the location of an L3 connection failure.

Such determinations are decidedly non-trivial. The challenges of providing a low-overhead and reliable approach to rapidly identifying failure locations are particularly challenging in network topologies offering multiple connection paths, whether for primary/backup usage or for load-balancing in multi-path routing.

SUMMARY

In one aspect, the present invention addresses Layer-3 (L3) connection monitoring between two "multi-attached" host nodes that are interconnected via an intervening communication network having a known network topology. The present invention provides the two-fold benefit of rapid connection failure detection and failure location determination. In one or more embodiments, the present invention "pinpoints" the failure location, improving the intelligence of any triggered failure recovery mechanism and/or providing better, more meaningful failure reporting. A Bidirectional Forwarding Detection (BFD) session is established between the local and remote host nodes for each L3 communication path between them, e.g., for each unique pairing of local and remote network attachment points. Upon the occurrence of an L3 connection failure, the pattern of up/down states for these BFD sessions is analyzed, along with knowledge of the network topology, to determine the apparent location of the L3 connection failure.

In one embodiment, a method performed at a local host node locates Layer-3 (L3) connection failures involving a remote host node that is linked to the local host node via multiple L3 communication paths defined by unique pairings of multiple local network attachment points at the local host node and multiple remote network attachment points at the remote host node. The method includes establishing a BFD session for each of the L3 communication paths, wherein the network topology uniquely pairs at least one of the local network attachment points with more than one of the remote network attachment points such that at least one of the local network attachment points is common to two or more of the L3 communication paths between the local and remote host nodes.

The method further includes monitoring BFD status information for each BFD session that indicates whether the BFD session is up or down. Because each BFD session corresponds to one of the L3 communication paths between the local and remote host nodes, one might also say that the BFD status information for any given one of the BFD sessions indicates whether the corresponding one of the L3 communication paths is up or down.

Still further, the method includes detecting an L3 connection failure based on determining that at least one of the BFD sessions is down, and determining an apparent location of the L3 connection failure by analyzing the pattern of up and down indications in the BFD status information in conjunction with knowledge of the network topology. Here, the "apparent" location of the connection failure does not necessarily provide an exact location or reason for the connection failure. However, the method does "pinpoint" the connection failure in terms of identifying the involved portion or segment of the overall connection path between the local and remote host nodes.

For example, one or more embodiments of the above method include identifying the location of the failure by determining whether the failure appears to be in a local link involving one of the local host node's network attachment points, or in a remote link involving one of the remote host node's network attachment points. Such identification is based at least in part on identifying from the pattern of up and down indications in the BFD status information (across the multiple BFD sessions) which local and/or remote network attachment points are associated with BFD sessions that are down. Here, a network attachment point is "associated" with a BFD session if the corresponding L3 communication path involves that network attachment point.

In another embodiment disclosed by way of non-limiting, illustrative example herein, a local host node is configured to L3 connection failures involving a remote host node that is linked to the local host node via multiple L3 communication paths defined by unique pairings of multiple local network attachment points at the local host node and multiple remote network attachment points at the remote host node.

The local host node comprises two or more of said local network attachment points, each configured for attaching the local host node to the communication network, a BFD session processor, and a failure processor. The BFD session processor is configured to establish a BFD session for each of the L3 communication paths, wherein the involved network topology uniquely pairs at least one of the local attachment points with more than one of the remote network attachment points, such that said at least one of the local network attachment points is common to two or more of the L3 communication paths between the local and remote host nodes.

To exploit this "one-to-many" mapping, where a least one of the local network attachment points supports more than one distinct L3 communication path to the remote host node and therefore is associated with more than one of the BFD sessions, the BFD session processor is further configured to maintain BFD status information for each BFD session that indicates whether the BFD session is up or down. In the case of an L3 connection failure, such an arrangement gives rise to several possibilities, including: none of the BFD sessions associated with a given local network attachment point are down; all of the BFD sessions associated with the given local network attachment point are down; or one or more but less than all such BFD sessions are down. The correspondence of up and down states taken across the multiple local network attachment points is analyzed in view of the known network topology to determine the apparent location of a detected L3 connection failure.

To that end, the failure processor is configured to detect an L3 connection failure based on determining that at least one of the BFD sessions is down. Again, a BFD session exists for each distinct L3 communication path between the local and remote host nodes as provided by the involved network topology, and at least one of local network attachment points is commonly shared between two or more of the L3 communications paths, meaning that two or more corresponding ones of the BFD sessions are associated with that local network attachment point.

Correspondingly, the failure processor is further configured to determine an apparent location of the L3 connection failure by analyzing the pattern of up and down indications in the BFD status information in conjunction with knowledge of the network topology. For example, the local host node includes network attachment points "A" and "B" and the remote host node includes network attachment points "C" and "D." Assume that the involved network topology provides the following distinct L3 communication paths: A-to-C, A-to-D, B-to-C, and B-to-D.

Using this example framework, there are four BFD sessions and the BFD session status information in the presence of a connection failure might indicate, for example "Session A-C is UP," "Session A-D is DOWN," "Session B-C is UP," and "Session B-D is DOWN." The failure processor identifies the common attachment point involved in the BFD sessions that are DOWN—here, attachment point "D" is the common point of failure. As such, the example local host network node would pinpoint the connection failure as involving the remote network attachment point D and/or the connection link between D and the remote host node.

While the present invention has broad applicability, those skilled in the networking arts will recognize significant advantages in the context of wireless communication networks, which often include the deployment of multi-attached "dual-homed" host nodes that provide interconnection between, say, the Radio Access Network (RAN) portion of a cellular communication network and one or more entities within the Core Network (CN), or between different host nodes within the CN. Non-limiting examples of the contemplated "local" host node described above include a network base station (e.g., NodeBs in the "WCDMA" context, and eNodeBs in the "LTE" context) having network connections to a media gateway or other supporting entity in the CN, and further include such gateways as interconnected to base stations, other gateways, call control functions, etc. Further, "enterprise" networks also heavily use multi-attached technology, where a local site is "multi-attached" to a core IP network for communicating with remote sites or a main corporate branch. The present invention thus finds valuable and direct application in enterprise networks.

Of course, the present invention is not limited to the example embodiments, features, and advantages, as described in this brief summary. Indeed, those skilled in the art will recognize additional features and advantages in view of the following detailed description and the accompanying figures.

BRIEF DESCRIPTION OF THE DRAWINGS

FIGS. 7-1, 7-2, and 7-3 are logic flow diagrams of one embodiment of method processing for the example network topology of FIG. 5A, for the failure condition in FIG. 6 in which all BFD sessions from the "active" link at the local node are down.

FIGS. 8-1 and 8-2 are logic flow diagrams of one embodiment of method processing for the example network topology of FIG. 5A, for the failure condition in FIG. 6 in which all BFD sessions from the "active" link are up, but where one or more of the BFD sessions on the "backup" link is down.

FIGS. 9-1, 9-2, and 9-3 are logic flow diagrams of one embodiment of method processing for the example network topology of FIG. 5A, for the failure condition in FIG. 6 in which only one BFD session is up for the "active" link.

FIGS. 10-1, 10-2, and 10-3 are tables summarizing the mapping of failure scenarios to use-case processing, for the numbered failure cases appearing in the logic flow diagrams of FIGS. 7-9, including the sub-FIGS. 7-1, 7-2, and so on.

FIGS. 12-1, 12-2, and 12-3 are logic flow diagrams of one embodiment of method processing for the example network topology of FIG. 11, for the failure condition in FIG. 6 in which all BFD sessions from the "active" link are down.

FIGS. 13-1 and 13-2 are logic flow diagrams of one embodiment of method processing for the example network topology of FIG. 11, for the failure condition in FIG. 6 in which all BFD sessions from the "active" link are up, but where one or more of the BFD sessions on the backup link is down.

FIGS. 14-1, 14-2, and 14-3 are logic flow diagrams of one embodiment of method processing for the example network topology of FIG. 11, for the failure condition in FIG. 6 in which only one BFD session is up for the "active" link.

FIGS. 15A-C depict a table setting forth a mapping between the various failure scenarios and the corresponding numbered failure cases appearing in the logic flow diagrams of FIGS. 12-14, including the sub-FIGS. 12-1, 12-2, and so on.

DETAILED DESCRIPTION

Figure 1:
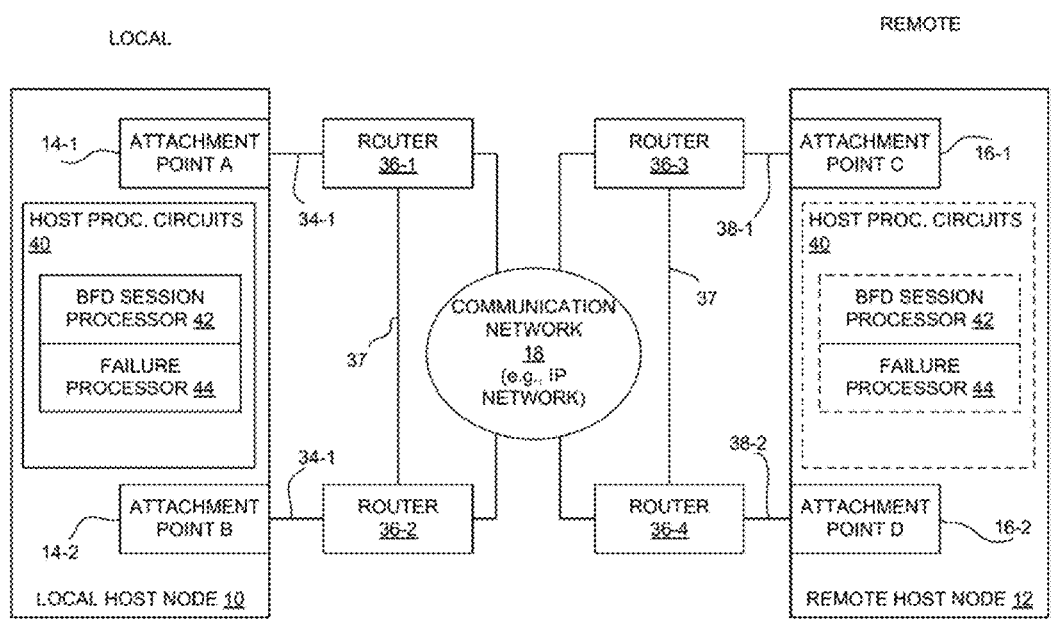
FIG. 1 is a block diagram of one embodiment of local and remote multi-attached host nodes that are communicatively connected through a communication network.

In the following example discussion, it will be understood that "L3" connotes the "Network" layer in the Open Systems Interconnection (OSI) model, as promulgated by the International Organization for Standardization. According to the OSI model, the Network or L3 Layer provides the functional and procedural mechanisms supporting the transfer of variable length data sequences across networks from a source host node to a destination host node. Accordingly, the Network Layer performs network routing functions and it should be noted that routers operate at the Network Layer.

In one or more aspects, the present invention addresses a number of issues, including these items: (1) fast detection of a L3 connection failure; (2) determination of the apparent failure of the L3 connection failure; and, correspondingly (3) rapid, intelligent recovery of the data traffic affected by a connection failure, based on the determined failure location. Locating the apparent location of a detected L3 connection failure involves "pinpointing" the connection failure with respect to the involved network topology and the various "segments" or "links" involved in the L3 communication paths between a local and a remote host node. Advantageously, the present invention uses BFD sessions, e.g., BFD "multi-hop" sessions for fast failure detection. (See RFC 5883 for general information regarding the use of BFD over multi-hop connections.) Further, the present invention uses an advantageous pattern analysis of up/down BFD session states in the presence of an L3 connection failure, along with knowledge of the network topology, to pinpoint the apparent location of the failure and, in at least one embodiment, to undertake rapid failure recovery, by conducting or otherwise initiating the switchover of communications traffic from a failed L3 communication path to one that remains operational.

As will be shown in example embodiments, such recovery solutions may involve, for example, switching over from a primary or preferred path to a backup path, where multiple network attachment points at the involved local and remote host nodes provide for one or more backup paths. One notable point is that all of the L3 communication paths between the local and remote host nodes are active in the sense that they at least carry BFD session packets for monitoring their end-to-end L3 connectivity, thus, in the above sense of "active" and "backup" paths, what is meant in this disclosure is that one of the L3 paths is designated as or otherwise functioning as the active path for carrying communications traffic between the local and remote host nodes, while the other L3 communication path(s) are considered as backups in case the active path fails.

Of course, in the sense that the currently active path fails and the communications traffic is moved to one of the backup paths, then that backup path may be considered as the new active path. Similar logic applies in the case that a particular one of the L3 communication paths is for some reason, such as by default configuration, considered the primary or preferred one of the L3 communication paths, while the remaining L3 communication paths are considered as backups to that primary or preferred path. Still further, the present invention fully applies to the case where the communications traffic flows on two or more of the L3 communication paths in parallel, at least in the absence of any L3 connection failures, such as in a load balancing arrangement.

Regardless of the particular scenario, the present invention advantageously adds meaningful intelligence to the failure detection, location, and traffic recovery mechanisms, by pinpointing whether the connection failure appears to involve a local link between the local host node and one or more of its network attachment points, or a remote link between the remote host node and one or more of its network attachment points. This knowledge allows, for example, the traffic recovery mechanism to select or configure a backup L3 communication path that avoids the affected link and/or to provide connection failure alarm or log information that identifies the affected link. By providing "richer" alarm or log information, the network operator can be quickly notified not only of the occurrence of a connection failure, but also of the apparent location of that failure. Such information enhances the reliability of the network by providing more useful failure information, and allows the necessary corrective actions to be undertaken more rapidly and more efficiently. Among other things, those features decrease network downtime, and lower maintenance and repair costs by increasing efficiency.

With these points in mind, FIG. 1 illustrations an example embodiment in which the present invention is implemented. Two host nodes 10 and 12 are illustrated and for discussion purposes the host node 10 is considered as the "local" host and the host node 12 is considered as the "remote" host. Those skilled in the art will recognize that the designations can be reversed, and that the present invention can be practiced at either host node 10 or 12, or across both such nodes.

In the illustrated example, the local host node 10 includes multiple network attachment points 14-1 and 14-2, which may be Network Interface Cards (NICs) or other network connection interfaces. For convenience, the network attachment points 14-1 and 14-2 are generally referred to as "multiple local network attachment points 14" and the individual suffix designations "-1" and "-2" are not used unless needed for clarity. Further, ones sees the labels "A" and "B" as applied to the respective attachment points 14-1 and 14-2, and those labels are used later in describing the logical processing associated with determining the location of a connection failure between the local host node 10 and the remote host node 12.

One sees that the remote host node 12 also includes multiple network attachment points 16, denoted individually as 16-1 and 16-2, and alternately designated by the respective labels "C" and "D." Because the example here considers the host node 10 as the local host, the multiple network attachments points 16 of the host 12 are referred to as "remote network attachment points," but those skilled in the art will appreciate that those attachment points would be considered "local" from the perspective of the host node 12 looking towards the host node 10. Along these lines, it will be understood that both host nodes 10 and 12 each may be configured to implement the present invention and that the notion of "local" and "remote" depends on the point of reference.

In any case, the multiple remote network attachment points 16 may be NICs or other interface circuits, such as will be understood by those of ordinary skill in the networking arts. Further, while the local host node 10 is shown with two network attachment points 14 and the remote host node 12 is also shown with two network attachment points 16, it will be understood that the present invention applies directly to essentially any number and combination of network attachment points 14 and 16 between the respective hosts 10 and 12.

As for network topology provided by communication network 18 when considered in view of the multiple local network attachment points 14 and the multiple remote network attachment points 16, it will be appreciated that multiple L3 communication paths are provided between the local and remote host nodes 10 and 12. In particular, it is assumed that the communication network 18 is an L3 multi-hop network, meaning that it includes one or more L3 devices (e.g., routers) interconnecting each local network attachment point 14 to a corresponding one of the remote network attachment points 16. Further, it is assumed that the involved network topology provides more than one L3 communication path from at least one of the local network attachment points 14 to two or more respective ones among the multiple remote network attachment points 16.

This topological characteristic may be viewed as a "one-to-many" (where "many" is two or more) mapping of local network attachment points 14 to remote network attachment points 16, such that two or more of the L3 communication paths between the local and remote host nodes 10 and 12 share the same local network attachment point 14. In a preferred but non-limiting example embodiment, there is "full" connectivity between the local and remote host nodes 10 and 12 at Layer 3, meaning that each local network attachment point 14 has an L3 communication path to each one of the remote network attachment points 16. One can look at such a topology as providing the maximum possible number of distinct L3 communication paths between the local and remote host nodes 10 and 12, when considered from an end-to-end perspective with one local network attachment point 14 anchoring one end of the path, and one remote network attachment point 16 anchoring the other end of the same path. Put another way, in at least one embodiment, the involved network topology provides an L3 multi-hop path between each unique pairing of local and remote network attachment points 14 and 16. As will be shown, the communication network 18 may provide such connectivity simply by providing a set of bridged, next-hop routers, or by providing an arbitrary number of hops in an IP network.

Thus, for purposes of determining the number of BFD sessions used for detecting and locating connection failures between the host nodes 10 and 12, the number of unique pairings between respective network attachment points 14 and 16 defines the total number of possible L3 communication paths having distinct pairings of local and remote network attachment points 14 and 16. According to the teachings herein, a BFD session is established for at least some number of these possible distinct L3 communication paths, and preferably for all of them. For the four network attachment points 14-1, 14-2, 16-1, and 16-2, involved in the example of FIG. 1, there are four unique paths defined by the unique pairings of local network attachment points 14 and remote network attachment points 16: {[14-1, 16-1], [14-1, 16-2], [14-2, 16-1], and [14-2, 16-2]}. In terms of the A, B, C, and D labels, the unique pairings are A-C, A-D, B-C, and B-D.

Figure 2:
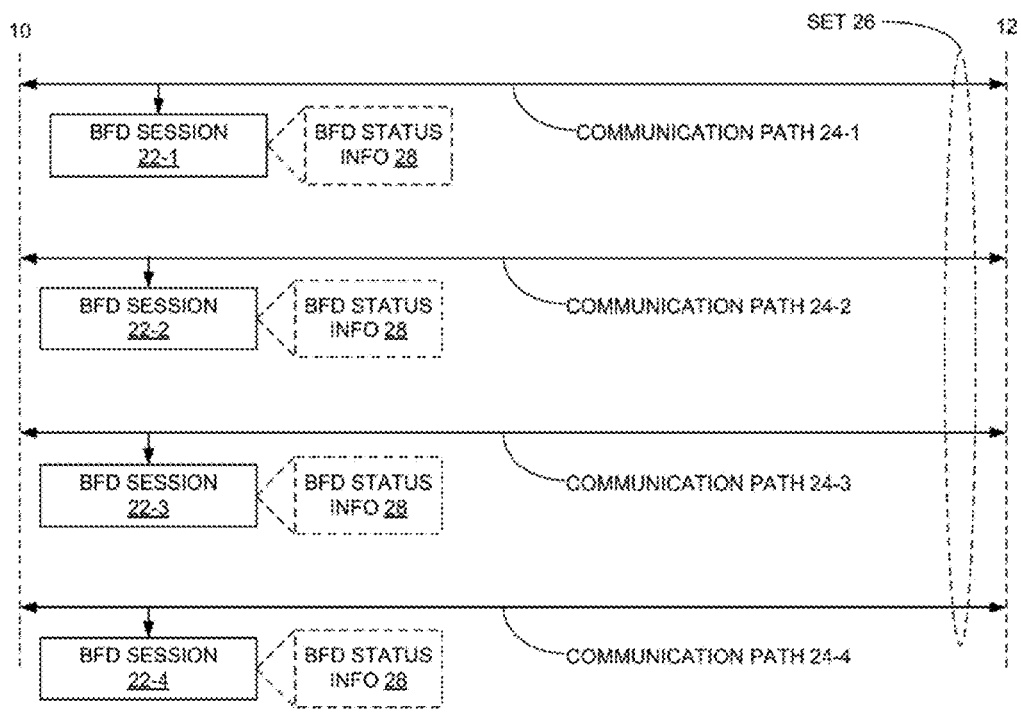
FIG. 2 is a diagram of Bidirectional Forwarding Detection (BFD) sessions and associated session information for all combinations of network attachment point pairings, for the multi-attached host nodes depicted in the example of FIG. 1.

Thus, as shown in FIG. 2, connection failure monitoring as taught herein and as applied to the example context of FIG. 1 involves: establishing a BFD session 22-1 for the L3 communication path 24-1, which corresponds for example to the A-C pair of network attachment points; establishing a BFD session 22-2 for the L3 communication path 24-2, corresponding to the A-D pair of network attachment points; establishing a BFD session 22-3 for the L3 communication path 24-3, corresponding to the B-C pair of network attachment points; and establishing a BFD session 22-4 for the L3 communication path 24-4, corresponding to the B-D pair of network attachment points.

Collectively, the multiple BFD sessions are referred to as "BFD sessions 24." Likewise, the corresponding plurality of L3 communication paths are referred to in the collective sense as "L3 communication paths 24." The overall number of L3 communication paths 24 involved will be understood as being defined by the overall number of possible combinations (unique pairings) of local network attachment points 14 at the local host 10 and remote network attachment points 16 at the remote host 12.

This overall number of L3 communication paths is represented in FIG. 2 as a set 26 of L3 communication paths 24 between the local host 10 and the remote host 12. One will note that BFD status information 28 is maintained for the BFD session 22 supported by each respective L3 communication path 24 in the overall set 26 of L3 communication paths. There is one BFD session 22 per L3 communication path 24 in the set 26, and the BFD status information 28 for a respective one of the BFD sessions 22 indicates the "up" or "down" state of that session, where "down" means that the session has failed (no receipt of session packets within qualifying time) and "up" means that the connection is good (ongoing timely receipt of session packets). Note that depending on the usage herein, the reference number "28" may refer to the BFD status information for a particular one of the BFD sessions 22, or in the aggregate to the BFD status information for all BFD sessions 22.

Turning back to FIG. 1, one sees that the local network attachment point 14-1 is associated with a local connection link 34-1, which couples it to a router 36-1. Similarly, the local network attachment point 14-2 couples to a router 36-2 through a local connection link 34-2. By way of non-limiting example, the connection links 34-1 and 34-2 are wired connections, e.g., wired Ethernet. The routers 36-1 and 36-2 couple to "remote" routers 36-3 and 36-4 and they represent L3 hops. The communication network 18 may further impose additional L3 hops. Also, note that the routers 36-1 and 36-2 may be linked via an optional bridge connection 37 and/or the remote routers 36-3 and 36-4 may be linked via an optional bridge connection 37. The bridge connection(s) 37 may be used for failover switching, to move traffic from a failed L3 communication path to a remaining good L3 communication path. Whether through such bridging or through hops within the communication network 18, one or more of the local network attachment points 14 is coupled to two or more remote network attachment points 16 through distinct L3 communication paths 24.

At the remote side the remote routers 36-3 and 36-4 couple the remote network attachment points 16-1 and 16-2 to the communication network 18 via respective remote connection links 38-1 and 38-2. In one aspect of the present invention, determining the "apparent" location of a connection failure involves pinpointing the connection failure to the particular local connection link 34 or remote connection link 38 that appears to be involved. In this regard, it may be understood that pinpointing the apparent location may have a certain granularity, e.g., the location may be determined as involving one of the local network attachment points 14 and/or its corresponding connection link 34 and associated router 36, or as involving one of the remote network attachment points 16 and/or its corresponding connection link 38 and router 36.

Of course, one applicable generalization is that the local host 14 can "locate" L3 connection failures more precisely when such failures involves one of its local connection links 34 (including, for example, a problem with one of its local network attachment points 14), as compared to a remote failure at the remote host node's side of the communication network 18. Broadly, however, in one or more embodiments related to the example network topology. of FIG. 1, the local host node 10 is configured to locate a detected L3 connection failure as being generally within the communication network 18, or in any one of the following segments: network attachment point 14-1, connection link 34-1, and router 36-1), {network attachment point 14-2, connection link 34-2, and router 36-2}, {network attachment point 16-1, connection link 38-1, and router 36-3}, and {network attachment point 16-2, connection link 38-2, and router 36-4}.

With the above in mind, in one or more embodiments of the present invention, the local host node 10 is configured to locate L3 connection failures involving the remote host node 12 (and/or any number of other remote host nodes not depicted). The local and remote host nodes 10, 12 each have multiple network attachment points 14, 16 for attaching to the communication network 18 that communicatively links the local and remote host nodes 10, 12.

In an example embodiment, the local host node 10 comprises two or more local network attachment points, e.g., 14-1, 14-2, each configured for attaching the local host node 10 to the communication network 18. As an example, the network attachment points 14 comprise Ethernet NICs or other such electrical/electronic interface circuits—sometimes referred to as physical layer circuits—and supporting protocol processors, for connecting to the communication network 18 according to a defined communications protocol or protocol stack.

The local host node 10 further comprises processing circuitry 40, which includes for example one or more microprocessors or other type(s) of digital processing circuitry, such as DSPs or FPGAs. In one or more embodiments, the local host node 10 includes at least one digital processing circuit that is configured according to its execution of stored computer program instructions held in memory or other computer-readable medium that is in or accessible to the processing circuitry 40. In at least one such embodiment, such program execution wholly or at least partly configures the processing circuitry 40 as a BFD session processor 42 and as an associated failure processor 44. Thus, in such embodiments, the BFD session processor 42 and failure processor 44 will be understood as functional circuits or processing blocks, implemented within a larger set of digital processing circuitry. In one or more other embodiments, the BFD session processor 42 and/or the failure processor 44 are at least partly implemented in fixed or otherwise dedicated hardware.

The particular manner in which these circuits are realized within the host node 10 is not a limiting aspect of the present invention; rather the present invention concerns the processing actions that such circuitry is configured to carry out. In that regard, the BFD session processor 42 in one embodiment is configured to establish a BFD session 22 for each L3 communication path 24 in the set 26 of all possible L3 communication paths, as defined by all unique pairings of the local network attachment points 14 at the local host node 10 with remote network attachment points 16 at the remote host node 12, and to maintain BFD status information 28 for each BFD session 22 that indicates whether the BFD session 22 is up or down. In the example of FIG. 1, the unique pairings are {14-1 to 16-1}, {14-1 to 16-2}, {14-2 to 16-1}, and {14-2 to 16-2}, meaning there are four distinct L3 communication paths 24, each one having its respective endpoints anchored by one of the unique pairings.

Figure 3:
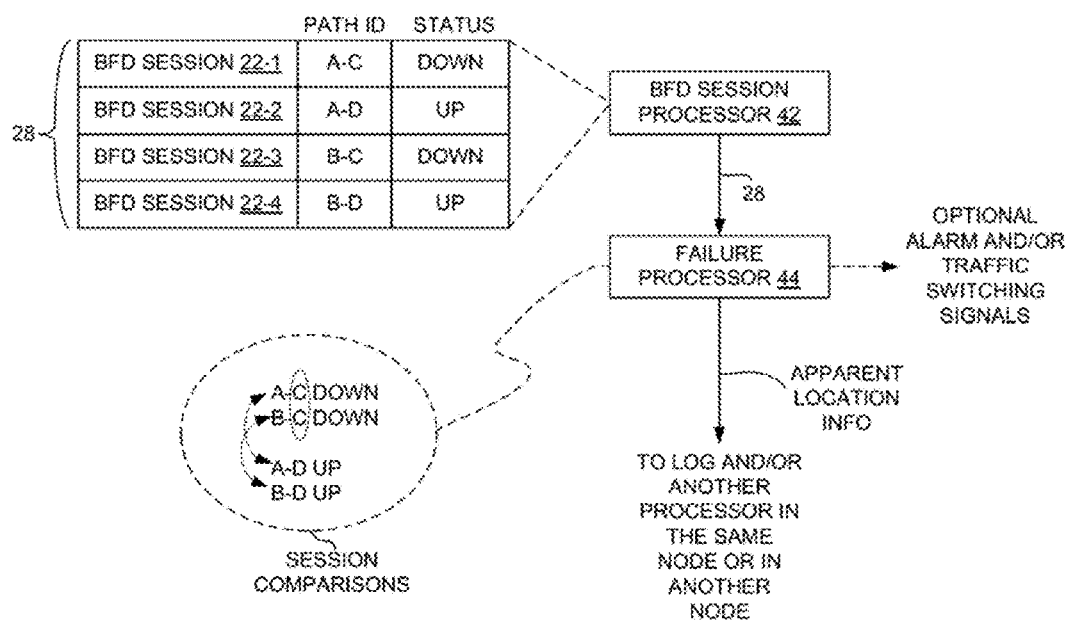
FIG. 3 is a block diagram of one embodiment of functional processing circuitry and associated data structures according to an example implementation of BFD session control and corresponding Layer-3 (L3) connection failure detection and processing in a multi-attached host node.

Further in the example embodiment, the failure processor 44 is configured to detect an L3 connection failure based on determining that at least one of the BFD sessions 22 is down and determine an apparent location of the L3 connection failure by analyzing the pattern of up and down indications in the BFD status information 28. As a non-limiting example of the pattern analysis carried out by the failure processor 44, FIG. 3 depicts an example table or other data structure representation of the BFD status information 28, for each of the BFD sessions 22 at issue in FIGS. 1 and 2. Namely, FIG. 3 illustrates a three-column data table representing an aggregation of the BFD session status information 28: each row corresponds to a different one of the BFD sessions 22, the first column identifies the particular BFD session 22, the second column identifies the L3 communication path 24 corresponding to the particular BFD session 22, and the third column indicates the up or down state of that particular BFD session 22 (as of the most recent status update for that session).

Such information is maintained by the BFD session processor 42 and provided to the failure processor 44 for failure detection and failure location determination. In the example illustrated in FIG. 3, the failure processor 44 detects an L3 connection failure based on determining that at least one of the BFD sessions 22 is down. In the example BFD status information 28 depicted in FIG. 3, the A-C L3 communication path is down and so too is the B-C L3 communication path. However, L3 communication paths A-D and B-D are both in the up state. The failure processor 44 analyzes this pattern of up and down indications in the BFD status information 28. Here, the failure processor 44 determines that all L3 communication paths involving the "C" connection are down—i.e., A-C is down and B-C is down. As a further mechanism for isolating the "C" connection as corresponding to the connection failure, the failure processor 44 recognizes that while the A-C L3 communication path is down, the A-D and B-D L3 communication paths are up, thus indicating that neither the "A" or "B" connections are involved in the connection failure.

By this logic, the failure processor 44 isolates or otherwise "pinpoints" the apparent location of the L3 connection failure as involving the "C" connection. Referring back to FIG. 1 for a moment, one sees that the "C" connection involves the router 36-3, the remote communication link 38-1 and the remote network attachment point 16-1 (attachment point "C"). By establishing a BFD session 22 for the set 26 of L3 communication paths 24, as defined by all possible pairings of local and remote network attachment points 14-1, 14-2 and 16-1, 16-2, the local host node 10 (1) provides monitoring of all such L3 communication paths 24 and (2) pinpoints the apparent location of connection failures involving any one or more of the such L3 communication paths 24. The former feature provides for richer and more robust failure monitoring, while the latter feature directly enables intelligent failure recovery—e.g., intelligent switchover of traffic in a manner that avoids pinpointed failure locations—or at least enables more specific failure reporting/alarm generation for operations & maintenance (O&M) nodes or other equipment.

Thus, in at least one embodiment, the failure processor 44 is configured to determine the apparent location of the L3 connection failure based on being configured to pinpoint from the pattern of up and down indications whether the L3 connection failure appears to be associated with: one of the local links 34-1 or 34-2, involving the local network attachment points 14-1 or 14-2 and/or one of the local routers 36-1 or 36-2; or one of the remote links 38-1 or 38-2, involving the remote network attachment points 16-1 or 16-2 and/or one of the remote routers 36-3 or 36-4.

In at least one embodiment, the failure processor 44 is configured to pinpoint the L3 connection failure based on being configured to recognize from the BFD status information 28 that not all L3 communication paths 24 in the set 26 of all possible L3 communication paths are down, and to correspondingly determine whether a particular one of the local or remote network attachment points 14-1, 14-2, 16-1, 16-2 is common to all L3 communication paths 24 having BFD sessions 22 that are down. If so, the failure processor 44 is configured to identify the local or remote communication link 34-1, 34-2, 38-1, 38-2 for that particular local or remote network attachment point 14-1, 14-2, 16-1, 16-2 as the apparent location of the L3 connection failure.

Note that here, identifying one of the communication links 38-1 or 38-2 (or 34-1 or 34-2) as the apparent location of the connection failure may be a general identification, e.g., with no attempt to determine whether the actual failure location is in the involved router 36 or network attachment point 14 or 16. However, in one or more embodiments, connection failure location determination determines to the extent possible whether the connection failure appears to be in one of the network attachment points 14 or 16, or in one of the routers 36, or in one of the connection links 34 or 38.

In particular, when the routers 36-1 and 36-2 are bridged via a bridge connection 37 (or, likewise, when the routers 36-3 and 36-4 are bridged via a bridge connection 37), further pinpointing of a detected connection failure is possible. For example, if traffic cannot be sent to the remote host node 12 via the router 36-3 and connection link 38-1, but can be successfully sent through router 36-3 over a bridge connection 37 with the router 36-4 and then on to the remote host node 12 via the network attachment point 16-2, then the failure location is pinpointed from the perspective of the local host node 10 as involving the connection link 38-1 and/or the network attachment point 16-1. Of course, the remote host node 12 in one or more embodiments includes connection failure diagnostic processing, such that the remote host node 12 can determine whether its network attachment point 16-1 has failed.

Those of ordinary skill in the networking art will recognize that the above example is somewhat specific to the configuration illustrated in FIG. 1. However, such processing equally applies for other numbers of network attachment points 14 or 16, connection links 34 or 38, and/or routers 36. The same, of course, is true for the up/down pattern analysis exemplified in FIG. 3—i.e., such failure analysis may be extended to essentially any number of connection pairings, as needed for the actual network topology at issue between the local and remote host nodes 10 and 12.

In any case, in one or more embodiments of the local host node 10, the failure processor 44 is configured to pinpoint a detected L3 connection failure based on being configured to recognize from the BFD status information 28 that all BFD sessions 22 are down and to correspondingly identify the communication network 18 as the apparent location of the L3 connection failure. That is, when all connections are down—none of the L3 communication paths 24 in the set 26 are up—the local host node 10 may be configured to identify a general connection failure associated with the network 18.

In the same or another embodiment, only one of the multiple L3 communication paths 24 between the local and remote host nodes 10 and 12 is active at any one time and the remaining one or more L3 communication paths 24 are considered as backup paths available for use if an L3 connection failure takes the active path down. Again, all of the L3 communication paths 24 are active in the sense that they carry BFD session packets, but only one path in this example is active for purposes of carrying communications traffic (e.g., signaling and/or user traffic in a communication network sense).

Of course, the particular one of the L3 communications paths 24 that is the active path can be dynamically changed, such as in a traffic recovery sense, where the currently-active L3 communication path 24 goes down and one of the backup L3 communication paths 24 is selected as the new active path. Further, in one or more embodiments, one of the multiple L3 communication paths 24 may be designated in advance—e.g., a default configuration—as the active path and maintained as such, absent any failures that prevent its use as the active path.

Thus, in one or more embodiments, the failure processor 44 is configured to determine from the BFD status information 28 whether the L3 connection failure has taken down the active L3 communication paths 24 and, if so, to initiate switching of communications traffic from the active L3 communication path to an alternate one of the L3 communication paths 24.

Note, however, in at least one embodiment, two or more of the multiple L3 communication paths 24 within the set 26 are active at the same time. Such a configuration is used, for example, for load balancing of communication traffic across two or more such paths. Failover switching of communication traffic may involve switching over from one or more of the active paths, to one or more of the backup paths, depending, for example, on the determined location of the L3 connection failure.

Of course, not every embodiment contemplated herein necessarily performs path switching or other failure recovery algorithms. In one or more embodiments, the local host node 10 does not necessarily undertake failure recovery processing responsive to detecting an L3 connection failure with respect to the remote host node 12. For example, in one embodiment, the local host node 10 is configured to initiate an alarm responsive to detecting an L3 connection failure. In particular, in at least one such embodiment, it initiates a low-priority alarm if the L3 connection failure takes down one of the L3 communication paths 24 that is considered as a backup path, and initiates a high-priority alarm if the L3 connection failure takes down the active path. Such functional behavior is obtained, for example, through configuration of the failure processor 44.

Further, even in configurations where the local host node 10 is configured to initiate failure recovery responsive to detecting an L3 connection failure and determining its location, such processing is done selectively in one or more embodiments, in dependence on the nature of the L3 communication path 24 affected by the failure. For example, in one embodiment, in the case that the BFD status information 28 indicates that the L3 connection failure has not taken down the active L3 communication path, the failure processor 44 is configured to raise a low-priority alarm to indicate the L3 connection failure but not to initiate the switching of communications traffic from the active L3 communication path.

Recognizing that in one or more embodiments there is an active L3 communication path 24 and one or more backup L3 communication paths 24 in the set 26 of all possible L3 communication paths 24, it will be understood that the active L3 communication path 24 is supported by an "active" one of the local network attachment points 14, an "active" one of the local communication links 34, and an "active" one of the local-side routers 36. The remaining local network attachment points 14, local communication links 34, and routers 36 are considered as being "backups." The same active and backup status may be logically associated with the remote host 12 and its network attachment points 16, communication links 38, and remote-side routers 36.

Within the above framework, any BFD session 22 that involves the active local network attachment point 14 (or, equivalently, that attachment point's local communication link 34) is considered to be associated with the active local network attachment point 14. For example, referring back to FIG. 1, the unique pairings of local and remote network attachment points 14 and 16 are these: {14-1, 16-1}, {14-1, 16-2}, {14-2, 16-1}, and {14-2, 16-2}. Each of these pairings represents a distinct L3 communication path 24—i.e., "distinct" in terms of its endpoints. Thus, the set of all possible L3 communications paths includes four paths and there are four corresponding BFD sessions 22. Assuming that the local network attachment point 14-1 supports the active L3 communication path, the two BFD sessions 22 that are anchored by the local network attachment point 14-1 are considered to be "associated" with the active L3 communication path 24—i.e., the BFD session 22 supported by the {14-1, 16-1} pairing and the BFD session 22 supported by the {14-1, 16-2} pairing. The remaining two BFD sessions 22 are considered as being associated with the backup L3 communication paths 24.

Within the above framework, failure processing involves determining whether none, less than all, or all of the BFD sessions 22 associated with the active local network attachment point 14 are down. For example, in one embodiment processing at the local host node 10 includes determining that all BFD sessions 22 associated with an active one of the local network attachment points 14 are down and in response switching communications traffic from the active local network attachment point 14 to a backup one of the remaining local network attachment points 14. Of course, such a switchover is conditioned on the backup local network attachment point 14 being associated with at least one BFD session 22 that is up. Put another way, the switchover from the active local network attachment point 14 to the backup network attachment point 14 is done if one or more of the L3 communication paths 24 associated with that backup local network attachment point 24 is up.

Note that "switching" the communication traffic from one L3 communication path 24 to another may be performed by the failure processor 44—i.e., actual switching of the traffic by the failure processor 44—or may comprise sending one or more messages or signals that initiate such switching by another circuit or entity.

In an extension of the embodiment immediately above, in a case where an L3 connection failure is detected but all BFD sessions 22 associated with the active L3 communication path are up, the failure processor 44 is configured to generate an alarm indicating the L3 connection failure but not to initiate switching of the communications traffic from the active L3 communication path.

Figure 4:
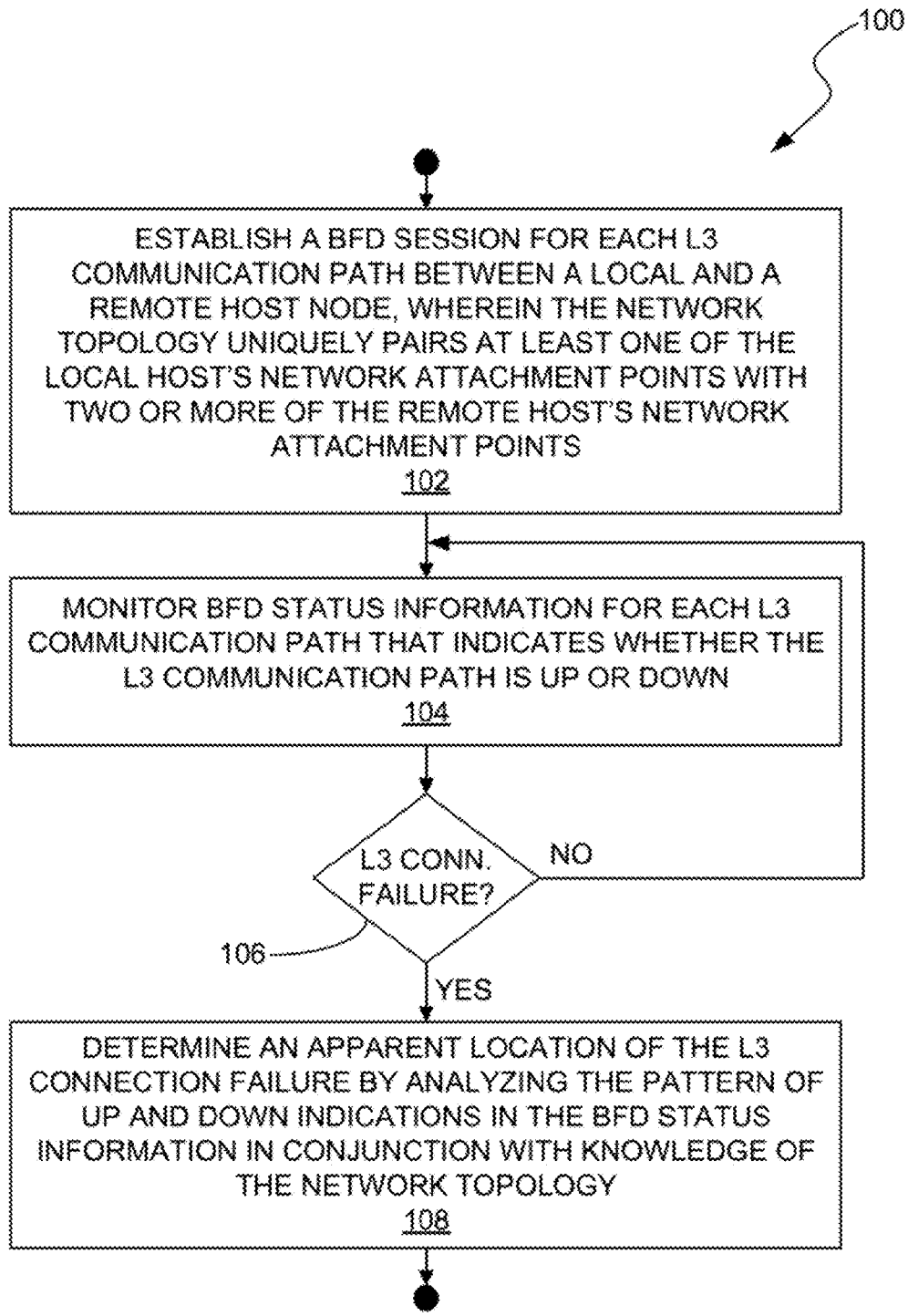
FIG. 4 is a logic flow diagram of one embodiment of a method at a local host node of detecting and locating L3 connection failures between local and remote host nodes, wherein the local and remote host nodes each have multiple network attachment points for attaching to the interlinking communication network between them.

With the above configuration examples for the local host node 10, it will be appreciated that the local host node 10 implements a method of locating L3 connection failures involving a remote host node 12, wherein the local and remote host nodes 10, 12 each have multiple network attachment points 14, 16 for attaching to the communication network 18 that communicatively links the local and remote host nodes 10, 12. FIG. 4 illustrates an example method 100, which is not necessarily performed in the illustrated order, and which in one example is implemented in the local host node 10 based on the execution of stored computer program instructions by the host processing circuits 40. Such circuits include or have access to memory, one or more storage devices, or other computer-readable medium that stores computer program instructions which, when executed by the digital processing circuitry included in the host processing circuits 40 configure the BFD session processor 42 and the failure processor 44 in accordance with the method 100, or variations thereof.

As for the processing actions comprising the method 100, one sees that the method 100 "begins" with establishing a Bidirectional Forwarding Detection (BFD) session for each of the L3 communication paths (Block 102), wherein a network topology uniquely pairs at least one of the local network attachment points 14 with more than one of the remote network attachment points 16 such that said at least one of the local network attachment points 14 is common to two or more of the L3 communication paths 24 between the local and remote host nodes 10 and 12.

The method 100 continues with monitoring BFD status information 28 for each BFD session 22 that indicates whether the BFD session 22 is up or down (Block 104). Further, the method 100 continues with detecting an L3 connection failure based on determining that at least one of the BFD sessions 22 is down (YES from Block 106), and determining an apparent location of the L3 connection failure by analyzing the pattern of up and down indications in the BFD status information 28 in conjunction with knowledge of the network topology. The "NO" path from Block 106 may be understood as repeating or continuing the monitoring for connection failures.

Knowledge of the network topology may simply be, from a logical processing perspective, information identifying or otherwise indicating which associations between the L3 communication paths 24 and respective ones of the attachment points 14 or 16, communication links 34 or 38, etc. Of course, more detailed information about the particulars of the communication network 18 also may be available.

Here, it should be noted that the method 100 may be performed on an ongoing or repeating basis, or as needed, and may be performed in conjunction with or as part of other processing. It should also be noted that the network attachment points 14 and 16 have heretofore been characterized as comprising the network interface cards or other network interface circuitry within the local and remote host nodes 10 and 12; however, those skilled in the art will appreciate that the term "network attachment point" may be generalized or otherwise conceived as including the host node's NIC, the corresponding one of the local communication links 34 or 38, and the corresponding one of the routers 36. That conceptualization is consistent with the failure localizing method contemplated herein, as each tuple of connection elements, i.e., NIC, communication link 34 or 38, and (network edge) router 36, represents one "connection" of the local or remote host 10 or 12 with the communication network 18.

Figure 5A:
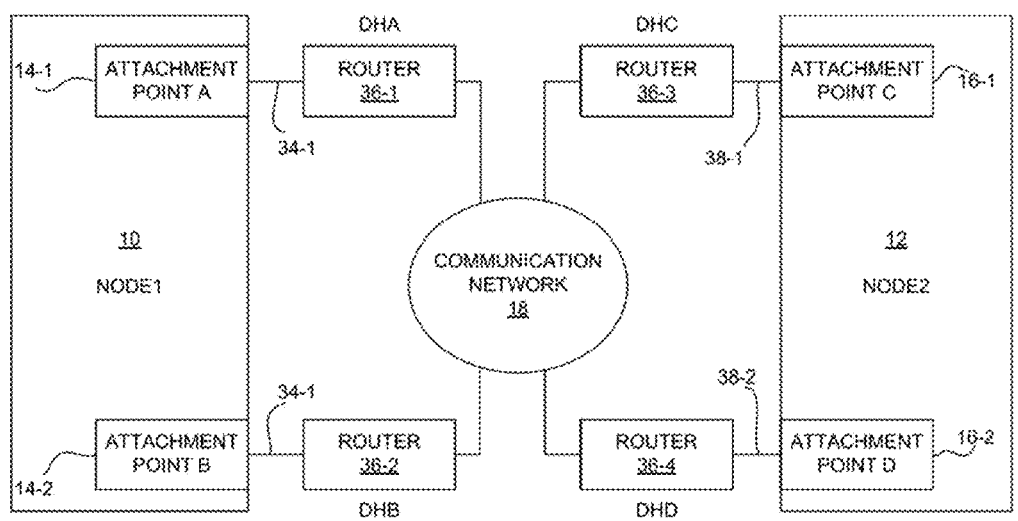
FIG. 5A is a block diagram of another example embodiment of local and remote host nodes interconnected by an arbitrary reliable IP network, where each host node has multiple attachment points to the network.

FIG. 5A depicts a network topology example much like that introduced in the example of FIG. 1, but the referencing is simplified for the sake of abbreviated notation in the "use case" table shown in FIG. 10 and corresponding to the failure recovery algorithm depicted in the flow diagrams of FIGS. 6-9. On this point, FIG. 6 may be regarded as a more detailed embodiment of the method depicted in FIG. 4, and FIGS. 7-9 should be understood as detailed breakouts of particular failure processing and analysis scenarios considered in FIG. 6.

Using the nomenclature of FIG. 5A/B, one sees that the local host node 10 is referred to as NODE1, while the remote host node 12 is referred to as NODE2. Further, router 36-1 is referred to as "DHA" indicating that it acts as a "dual-homed" device interconnecting NODE1 to the communication network 18 through the network attachment point labeled "A" at NODE1. Likewise, the routers 36-2, 36-3, and 36-4 are referred to as DHB, DHC, and DHD, respectively, to indicate their associations with network attachment points B, C, and D. It will be understood that the network attachment points A, B, C, and D, are NIC or other such interface circuits.

The communication network 18 may be an "arbitrary" IP network having any number of intermediate routing hops between the edge devices DHA, DHB, DHC, and DHD. Further, it will be understood that the earlier discussed L3 communication paths 24 may be understood as involving particular combinations of network attachment points A, B, C, and D, and particular combinations of the dual-homed devices DHA, DHB, DHC, and DHD, along with their respective connections 34-1, 34-2, 38-1, and 38-2. For example, one L3 communication path 24 provided by the illustrated arrangement can be denoted as path A-DHA-DHC-C, indicating the path between NODE1 and NODE2 wherein traffic flows through network attachment points A and C and their respective dual-homed hosts DHA and DHC. This path may be viewed as including a link A-DHA as between the network attachment point A and the dual-homed device DHA, and a link C-DHC, as between the network attachment point C and the dual-homed device DHC. Likewise, a second L3 communication path 24 uses the network attachment point B at NODE1, the network attachment point D at NODE2, and the respective dual-homed devices DHB and DHD. This second path includes links B-DHB and D-DHB.

In at least one embodiment, there is only one L3 communication path 24 that is active at a time. Absent connection failures, a preferred one of the L3 communication paths 24 may be used as the active path. Traffic flows only on the active path and the other L3 communication path(s) 24 are "backup" L3 communication paths. In case a connection failure disables the active path, one or more processing embodiments described herein switch over the traffic from the active path to a backup path that is still up.

Figure 5B:
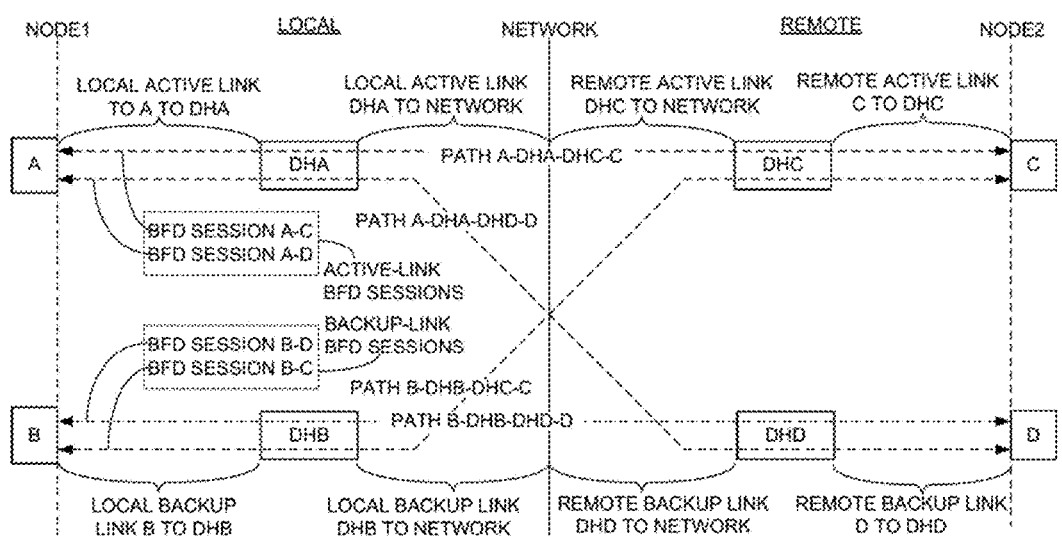
FIG. 5B is a schematic of L3 communication paths and their respective endpoints at NODE1 and NODE2 as presented in FIG. 5A, along with identification of the local active and backup links, and their associated BFD sessions.

In such contexts, it will be appreciated that one of the local network attachment points 14, along with one of the local communication links 34 and a corresponding one of the routers 36-1 and 36-2, will collectively be associated with the active one of the L3 communication path 24. More particularly, the intermediate segments or links along the active L3 communication path 24 will be defined by the particular one of the local network attachment points 14 used to support the active L3 communication path, along with the directly corresponding local router 36. These elements are referred to as "active link" elements. See, e.g., FIG. 5B.

Assume there are four L3 communication paths 24 between NODE1 and NODE2: PATH A-DHA-DHC-C, PATH A-DHA-DHD-D, PATH B-DHB-DHC-C, and PATH B-DHB-DHD-D. Assume that PATH A-DHA-DHC-C is designated as the active path for carrying data traffic between NODE1 and NODE2. (These designations may be shortened as Paths A-C, A-D, B-C, and B-D.) Consequently, the remaining paths are considered as backup paths, which may be activated if the active path goes down (assuming they are not also down).

Thus, any BFD session 22 that involves any communication links associated with the active path may be regarded as an "active-link" BFD session 22. Conversely, BFD sessions 22 that do not flow on any active-path communication links may be regarded as "backup-link" BFD sessions 22. More particularly, from the local perspective of NODE1 and in the network topology example of FIG. 5A, the four BFD sessions 22 may be understood as including two local active-link BFD sessions 22, because there are two BFD sessions 22 anchored by the active local network attachment point A and flowing on the corresponding local active communication link between that attachment point and DHA. The remaining two BFD sessions 22 are anchored at NODE1 by the network attachment point B, and flow over the local backup communication link between that attachment point and DHB. (Similar remote-referenced designations can be made at the remote NODE2.)

For the network topology illustrated in FIG. 5A/B, a BFD multi-hop session 22 is established from each network interface A and B on the local host node 10 to every remote network interface C and D on the remote host node 12. Namely, the following BFD sessions 22 are established: BFD session from A to C; BFD session from A to D; BFD session from B to C; BFD session from B to D. Again, as an example, one may assume that Path A-C is the active one, so the two BFD sessions 22 associated with attachment point A are local active-link BFD sessions with respect to NODE1, and the two BFD sessions associated with attachment point B are local backup-link BFD sessions with respect to NODE2.

The status of these four BFD sessions 22 is used to drive the failure recovery algorithm represented by the processing example collectively depicted in FIGS. 6-9 and provided by the use-case mapping shown in Table 1 of FIG. 10. Upon the occurrence of an L3 connection failure, the resulting matrix of up and down state indications in the BFD status information 28 for the four BFD sessions 22 provides information on where the failure is located, and therefore may be used to determine the proper failure recovery actions to take in terms of generating the proper notifications or alarms and/or in switching over the traffic from a failed path to a remaining good path.

In at least one embodiment, the failure recovery algorithm includes one or more (or all) of the following processing actions: notification, to the operator (or administrator) of the local node, of a particular link failure, specifying the location of the failure in terms of local or remote node failure, as well as the associated NIC (e.g. A, B, C, D); notification to verify the integrity of a particular link, if it is found that a particular BFD sessions matrix can have simultaneous link failures which can optionally involve the particular link; notification of node isolation, if it is determined that no healthy path exists between the two host nodes, while also distinguishing between local or remote node isolation; switching the data traffic from one failed active link to a healthy backup link; and forcing the traffic to go through a preferred one of the available L3 communication paths 24 when multiple failure types can result in identical up/down state patterns in the BFD sessions matrix based on the BFD status information 28 maintained for all BFD sessions 22, and two healthy paths can be selected. Here, "healthy" means an L3 communication path 24 that is up/available according to its BFD status information 28, and "preferred" means that a given path is favored in some sense over another one, when there is a choice of using either such path. "Preference" in this sense may be dynamically determined, such as based on a routing "cost" algorithm, network loading conditions, etc., or may be determined based on a static designation, such as where a given path is predetermined to be the primary or main path, while another one is predetermined to be a backup or secondary path.

The recovery algorithm specifics provided in the example of FIGS. 6-9 and in the corresponding use-case table of FIG. 10 applies to the case where: two multi-attached dual-homed host nodes are connected through an arbitrary IP network—e.g., NODE1 and NODE2 interconnected through the communication network 18 as shown in FIG. 5A. On each host node, there are two network attachment points to the IP network, each through a dual-homed device or next-hop router (NHR). In one embodiment, one of the L3 paths between the host nodes may be a primary path, and the NIC at each host node supporting that primary L3 path may be considered as the primary or active-path NIC. Correspondingly, the BFD sessions 22 supported by the primary or active-path NIC are considered to be primary or active-path sessions. Of course, the other host node NICs and their respective paths are kept alive at L3, for the BFD sessions 22 supported by them. These BFD sessions 22 may be considered to be backup-path BFD sessions 22. (In other embodiments, load sharing among the available L3 paths is used and there may not be any designated primary path.)

Figure 6:
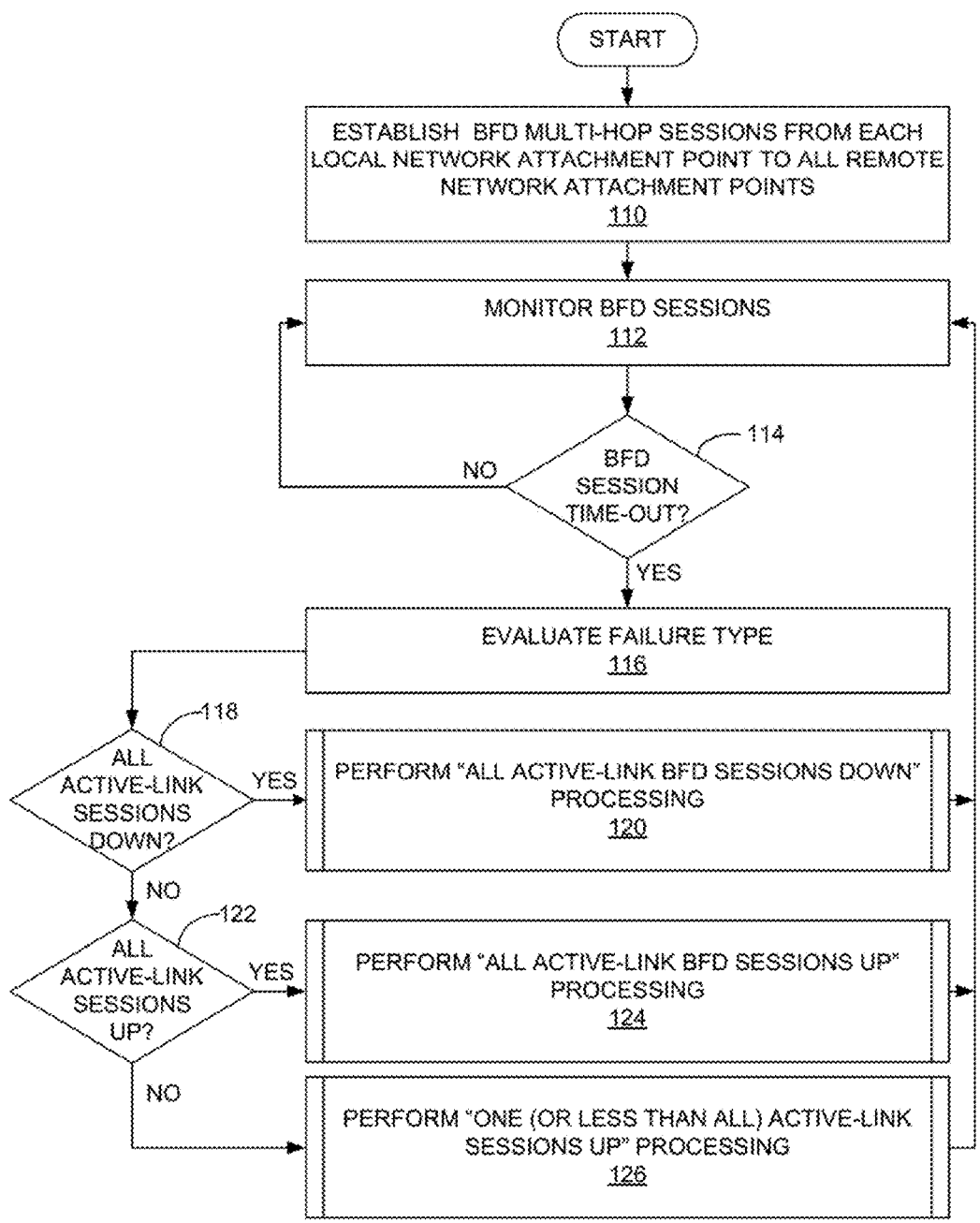
FIG. 6 is a logic flow diagram providing more details for an example implementation of the method introduced in FIG. 4, such as may be implemented in the local and/or remote host nodes depicted in FIG. 5A and in FIG. 11.

Turning to the details of FIG. 6, the illustrated embodiment of the method 100 includes establishing BFD multi-hop sessions 22 for the A to C path, the A to D path, the B to D path, and the B to C path (Block 110). The illustrated embodiment further includes monitoring the established BFD sessions 22, to see whether any of them have timed out (Block 112). Here, a timed-out connection indicates a connection failure on the associated L3 communication path 24. If any of the BFD sessions 22 have timed out (YES from Block 114), processing continues with evaluating the failure type (Block 116). In this particular embodiment, a first type of connection failure corresponds to the case where all BFD sessions 22 associated with the active L3 communication path 24 are down (YES from Block 118). In this case, processing continues with a series of actions collectively grouped in Block 120 and shown by way of example in FIG. 7.

If the evaluation in Block 118 results in "NO," processing continues with testing for a second failure condition, the case where all sessions from the active L3 communication path 24 are up. If so, (YES from Block 122), processing continues with a series of processing actions collectively depicted in Block 124 and shown by way of example in FIG. 8. Further, if the evaluation in Block 122 results in "NO," processing continues for the failure case where only one of the BFD sessions 22 is up for the active L3 communication path 24. In this last failure condition, processing continues with a series of actions collectively depicted in Block 126 and shown by way of example in FIG. 9.

With regard to the three failure conditions represented by Blocks 120, 124, and 126 in FIG. 6, an example assumption is that the L3 communication path 24 through the A and C network attachment points of NODE1 and NODE2, respectively, along with their respective dual-homed host devices DHA and DHC, constitute the "active" path. From the NODE1 perspective, all BFD sessions 22 that involve the A network attachment point can be regarded as "active-path sessions." All BFD sessions 22 that involve the B network attachment point can be regarded as "backup-path sessions." The same active-path and backup-path designations apply from the perspective of NODE2, for the network attachment points C and D, respectively.

So, for example, at NODE1, the network attachment point A is considered the active connection point, the link to it is considered the active link, and it supports the active path. This active path remains active from the perspective of NODE1 so long as there is at least one L3 communication path 24 from the network attachment point A to NODE2, regardless of whether that connection involves A to C or A to D—because D serves as the backup to C, D can handle traffic coming from the network attachment point A of NODE1 if network attachment point C is down at NODE2. So, as long as there is a path to NODE2 from network attachment point A, the "active link" will stay as is (i.e., A to DHA).

Figure 7:
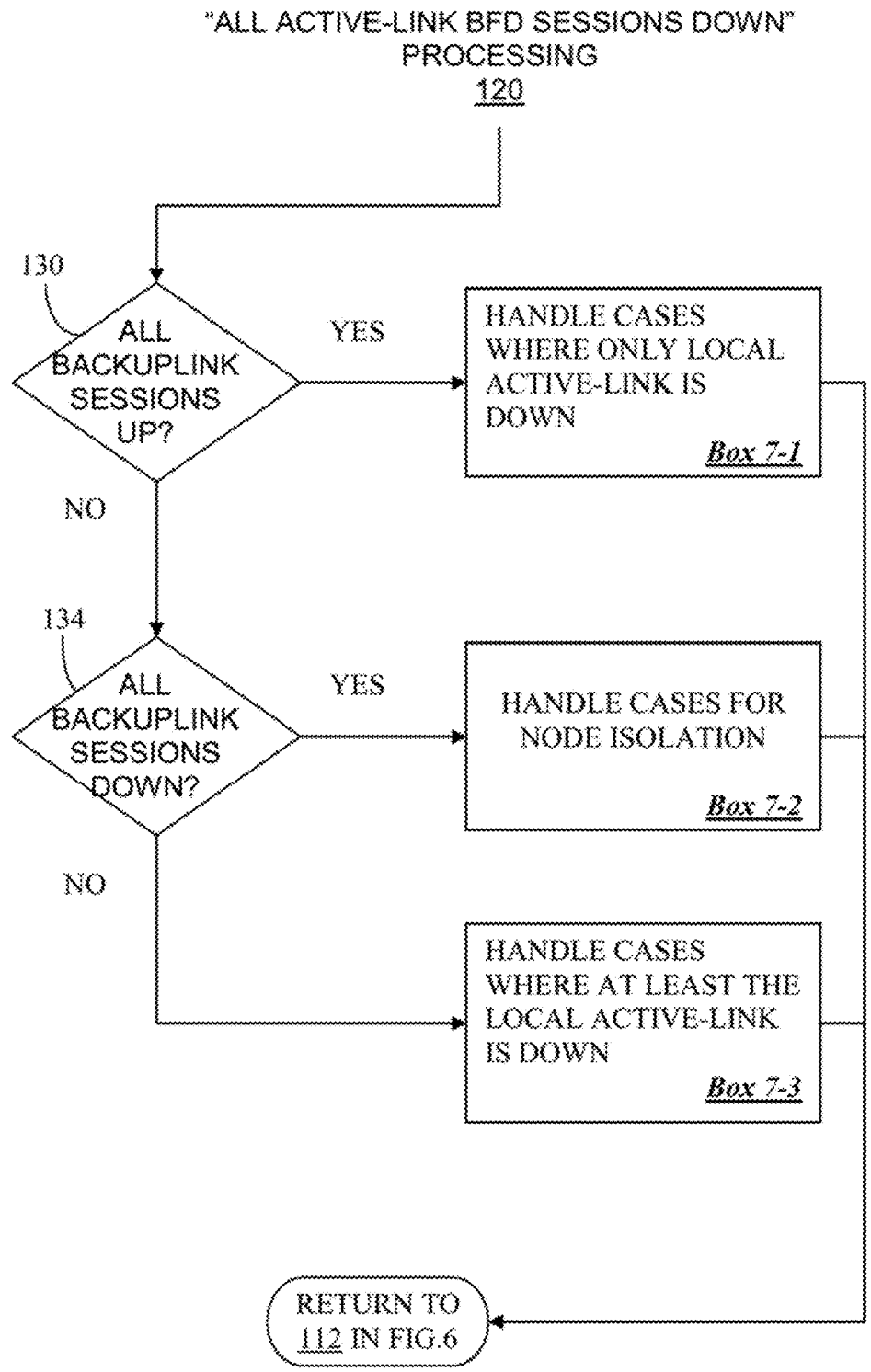
FIG. 7 and its associated
Figures 1, 7:
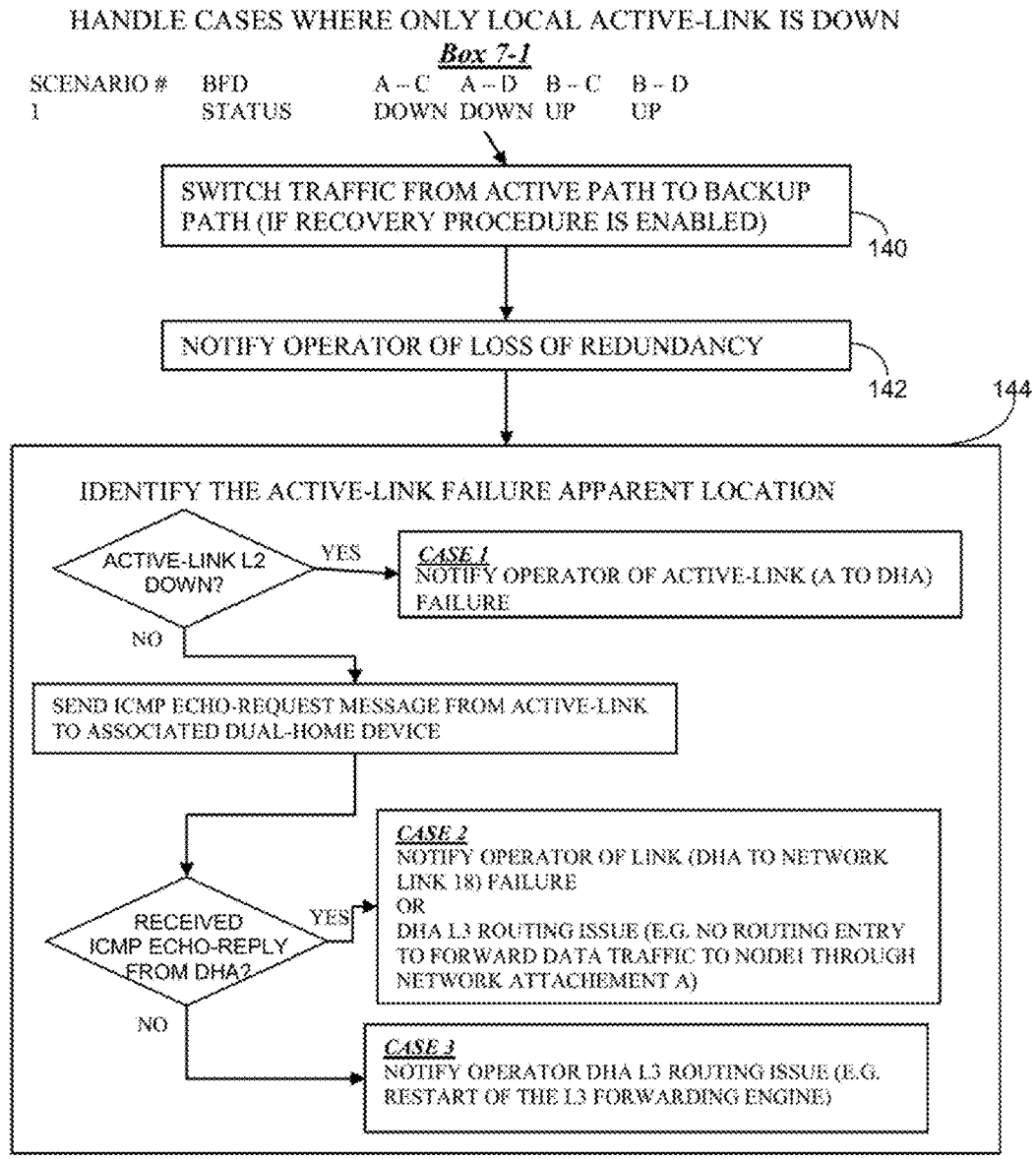
Figures 2, 7:
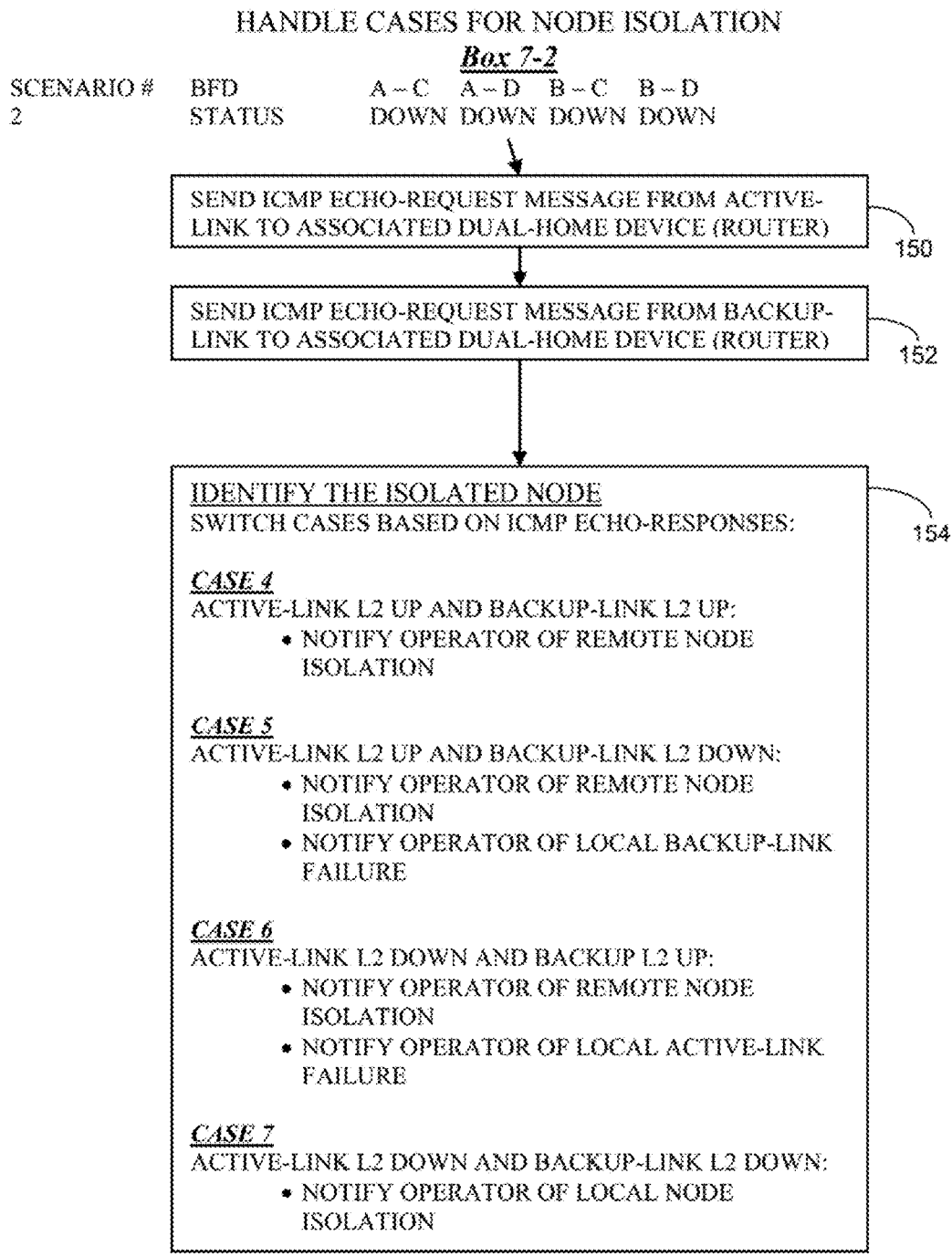
Figures 3, 7:
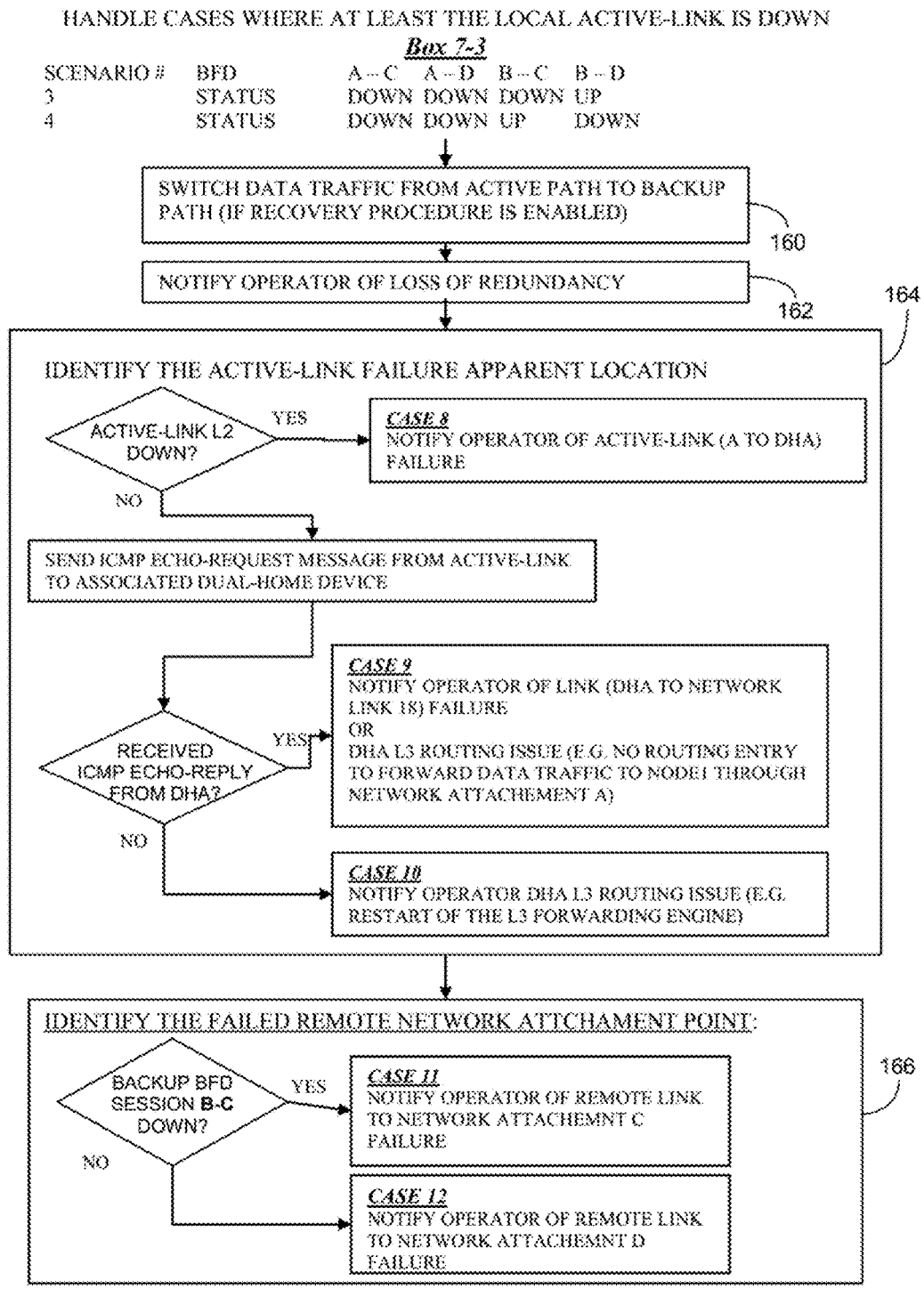

FIG. 7 illustrates the connection failure case for Block 120 from FIG. 6—the all active-link BFD sessions down case. Processing here assumes that there is one primary or active-link network attachment point 14 at the local host node 10 and one backup-link network attachment point 14. For example, referring to FIG. 5A, NODE1 is considered as the "local" host node and NODE2 is the remote host node. Further, network attachment point A at NODE1 is considered to be the primary or active attachment point for the local links to the communication network 18, while the network attachment point B is considered to be the backup attachment point. Thus, the BFD sessions 22 supported by the network attachment point A are local "active-link" sessions (these include the A-to-C session and the A-to-D session), while the BFD sessions supported by the network attachment point B are local "backup-link" sessions (these include the B-to-C session and the B-to-D session).

Processing includes determining whether all backup link sessions are up (Block 130). If so (YES from 130), processing continues with handling cases where only the local active link is down—i.e., the local network link involving attachment point A at NODE1. That condition can be deduced because B-to-C and B-to-D are still up, meaning that the connection failure local to the network attachment point A. Such processing is illustrated in Box 7-1 of FIG. 7-1.

If not all backup-link sessions are up (NO from 130), processing continues with determining whether all local backup-link sessions are down (Block 134). If so (YES from 134), processing continues with handling "node isolation" (Box 7-2, illustrated in FIG. 7-2). Here, it will be appreciated that local NODE1 is isolated if all its local active-link sessions are down and all of its local backup-link sessions are down. If not all backup-link sessions are down (NO from 134), processing continues with handling the cases where at least the local active link is down (Box 7-3, illustrated in FIG. 7-3).

FIG. 7-1 provides details for Box 7-1 processing. To reiterate assumptions relevant to the processing example of FIG. 7-1: NODE1 connects to NODE2 through A-DHA-DHC-C and A-DHA-DHD-D and through B-DHB-DHC-C and B-DHB-DHD-D; NODE1 is considered to be the local host node; the local link from A to DHA is the local active link; the local link from B to DHB is the local backup link; BFD sessions 22 supported on the local active link are considered to be active-link sessions; BFD sessions 22 supported on the local backup link are considered to be backup-link sessions; the local active link supports a primary or active L3 communication path 24 to NODE2, while the local backup link supports a backup L3 communication path 24 to NODE2.

As noted in FIG. 7, FIG. 7-1 deals with "Scenario #1" where only the local active link at NODE1 is down, where the following BFD statuses apply: A-C DOWN, A-D DOWN, B-C UP, and B-D UP. Processing includes an optional switching of traffic from the active L3 communication path 24 to the backup L3 communication path 24, if such a switchover mechanism is enabled at NODE1 (Block 140). Processing continues with notifying the operator of a loss of redundancy at NODE1 (Block 142)—meaning that NODE1 is no longer multi-attached to the network 18. Such notification may be based on the generation of an alarm message or signal.

Processing then continues with determining the apparent location of the active-link failure (Block 144). Such processing results in the selection of one of three notification cases, Case 1, Case 2, or Case 3, depending upon the status of the active-link L2 and/or the status of the associated router L3.

FIG. 7-2 deals with "Scenario #2" where NODE1 has lost connectivity through A and through B, i.e., the following BFD statuses apply: A-C DOWN, A-D DOWN, B-C DOWN, and B-D DOWN. Processing includes sending an ICMP echo-request message on the active link (from A) to DHA (Block 150), and sending an ICMP echo-request message on the backup link (from B) to DHB (Block 152). The results of these messaging operations are used in identifying the particular cases giving rise to node isolation (Block 154). Such processing determines the node isolation failure as being one of "Case 4," "Case 5," "Case 6," or "Case 7," according to the details shown in FIG. 7-2.

FIG. 7-3 illustrates the processing of Box 7-3 from FIG. 7 and it covers two scenarios: "Scenario #3" and "Scenario #4." In both scenarios, both local active-link sessions are down (A-C DOWN and A-D DOWN), and a different one of the two local backup-link sessions are down. In Scenario #3, the B-C session is DOWN, and in Scenario #4, the B-D session is down. Put another way, in the context of current A-C, A-D, B-C, B-D example, the Box 7-3 processing handles the case where both local active-link sessions are down and one of the two local backup-link sessions is down.

Processing includes an optional failure recovery operation in which the traffic that was being carried on the local active link is switched over to the remaining good backup link (Block 160). Processing further includes notifying the operator of the loss of redundancy at NODE1 (Block 162) and continues with determining the apparent location of the active-link failure (Block 164) and remote link failure (Block 166). The possible failure cases include Cases 8-12, which are as described/defined in the diagram.

Figure 8:
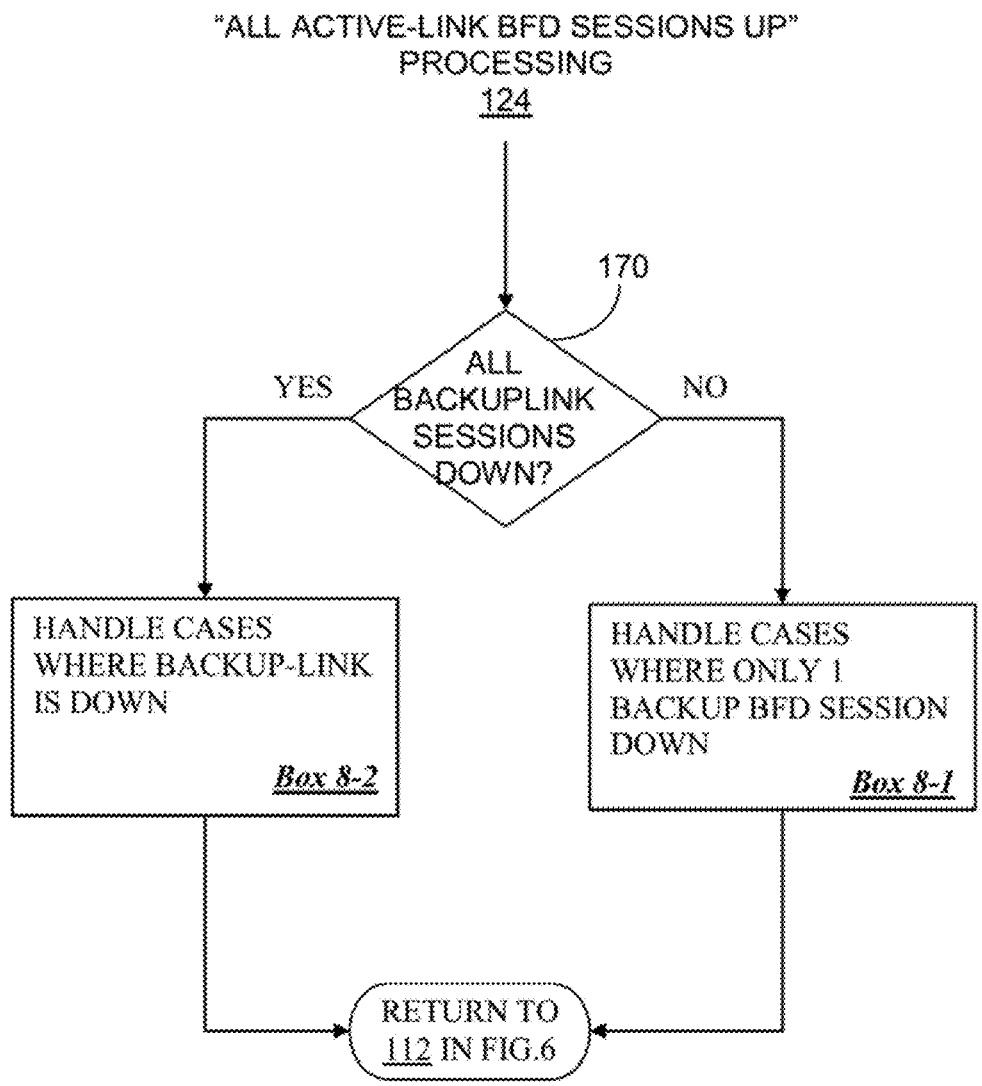
FIG. 8 and its associated
Figures 1, 8:
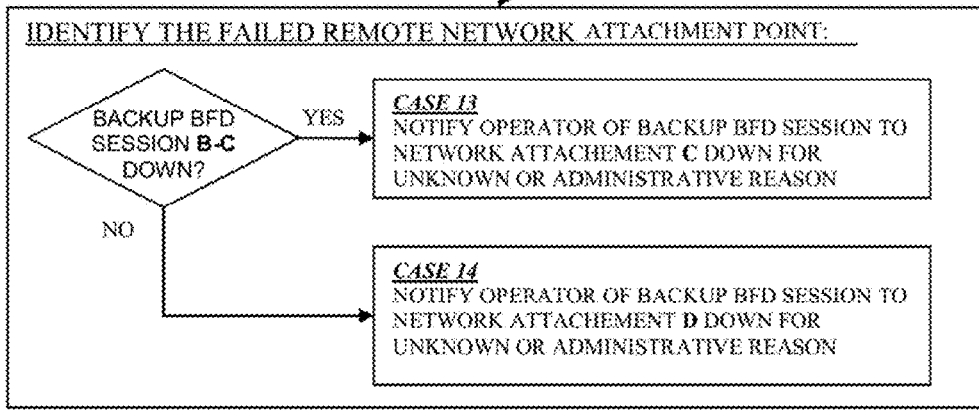
Figures 2, 8:
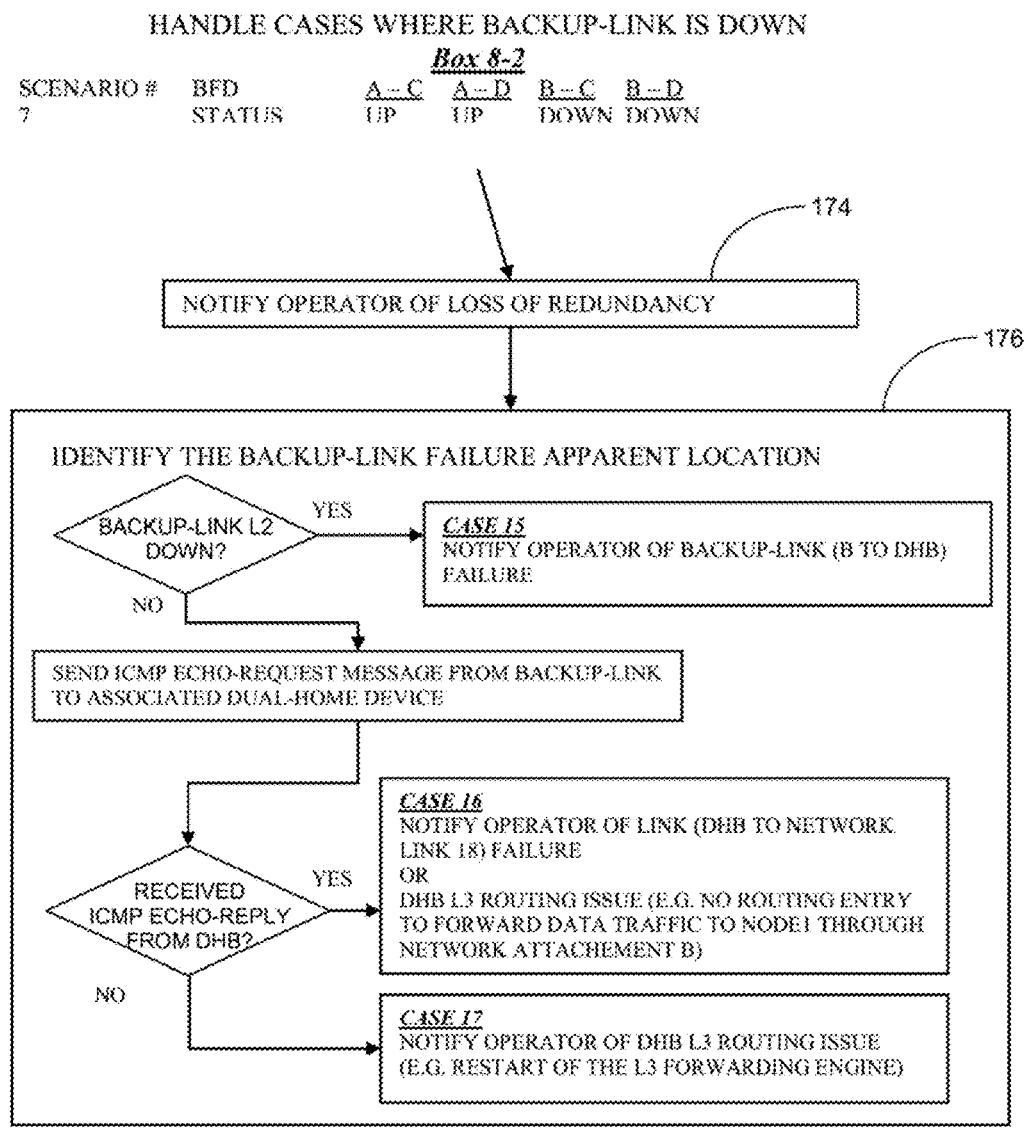

FIG. 8 illustrates example processing associated with the "all active-link BFD sessions up" processing in Block 124 of FIG. 6. According to the FIG. 6 flow, the processing of FIG. 8 occurs responsive to a L3 connection failure detection, for the case where all active-link sessions are up. With all local active-link sessions up, the L3 connection must have been detected for one of the local backup-link sessions—i.e., the BFD sessions 22 supported by the backup network attachment point B at NODE1.

Thus, processing FIG. 8 begins with determining whether all of the local backup-link sessions are up (Block 170). If so (YES from 170), processing continues with the processing of Box 8-2, which deals with the case where the local backup link is down (i.e., where both the B-C and the B-D BFD sessions 22 are down). If no (NO from 170), processing continues with processing of Box 8-1, which deals with the case where only one of the two local backup-link sessions is down (i.e., where either the B-C or the B-D BFD session 22 is down).

FIG. 8-1 illustrates the processing of Box 8-1. That processing includes identifying which one of the remote host node's network attachment points is down (Block 172). That processing is based on determining whether the B-C session is up or down. If it is down, the illustrated Case 13 processing is carried out; otherwise, the illustrated Case 14 processing is performed—Case 14 will be understood as corresponding to the B-D session being down.

FIG. 8-2 illustrates example processing for Box 8-2 of FIG. 8, which pertains to the case where both local backup-link sessions are down, i.e., where the B-C and B-D sessions are down. This scenario is denoted as Scenario #7, and it has the following BFD session status: A-C UP, A-D UP, B-C DOWN, and B-D DOWN.

Box 8-2 processing includes notifying the operator of the loss of redundancy (Block 174) and identifying the apparent location of the backup link failure (Block 176). Such processing includes Cases 15-17, as detailed in the diagram.

Figure 9:
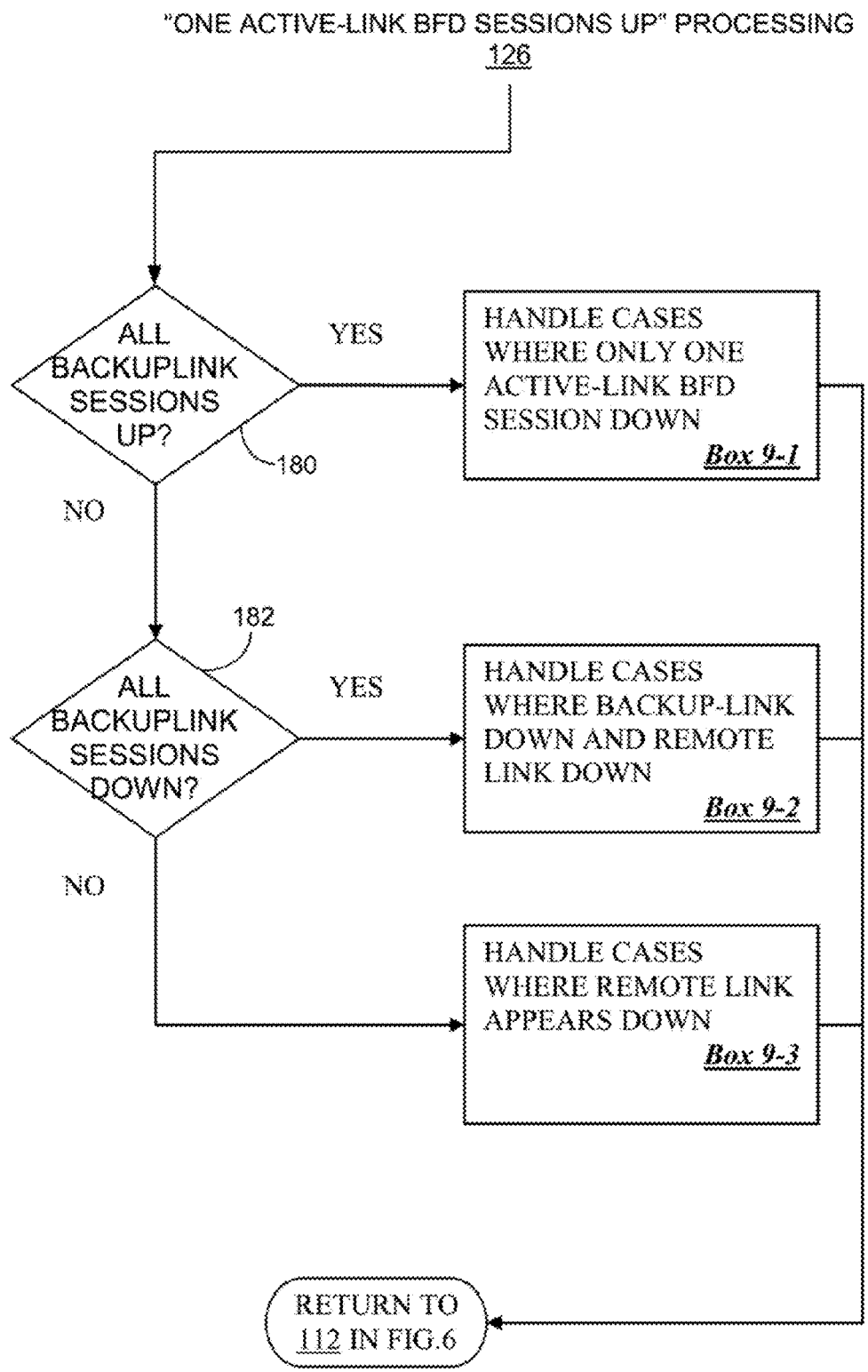
FIG. 9 and its associated
Figures 1, 9:
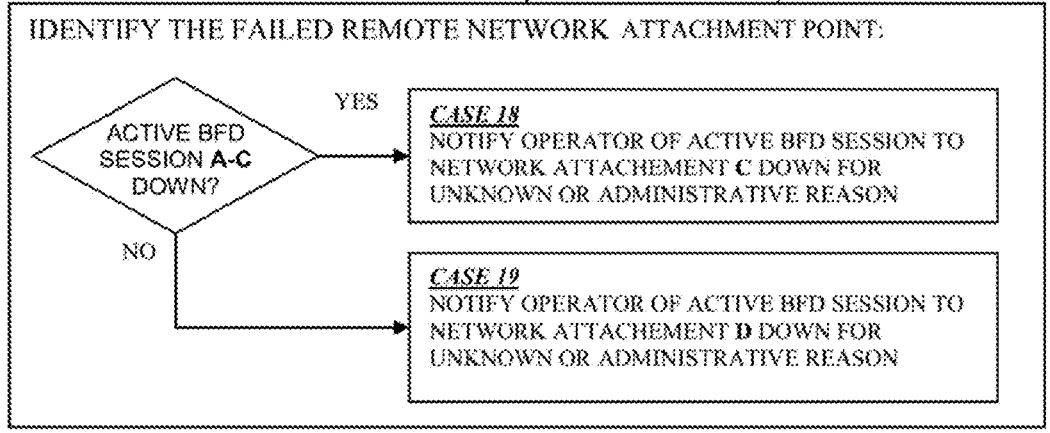
Figures 2, 9:
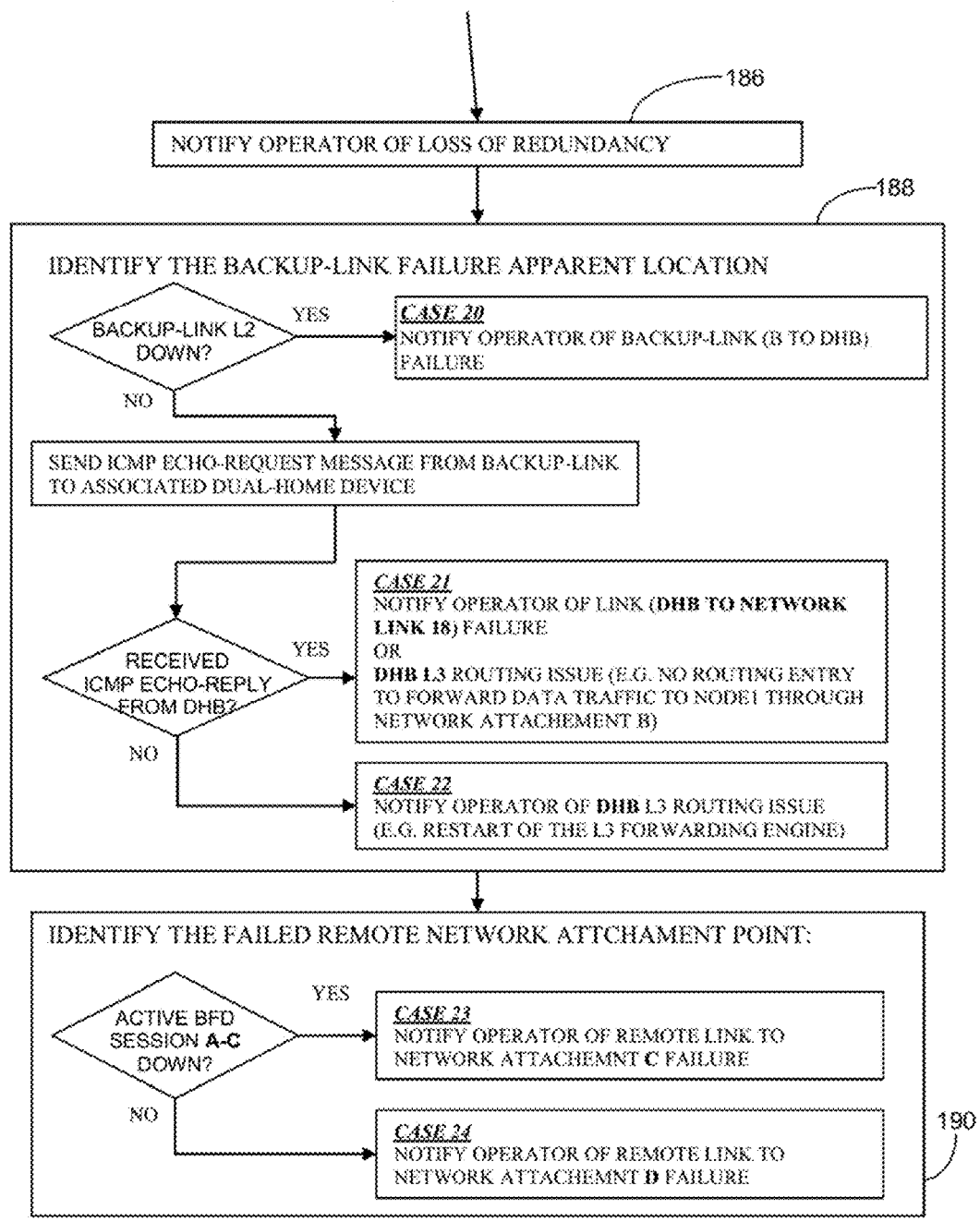
Figures 3, 9:
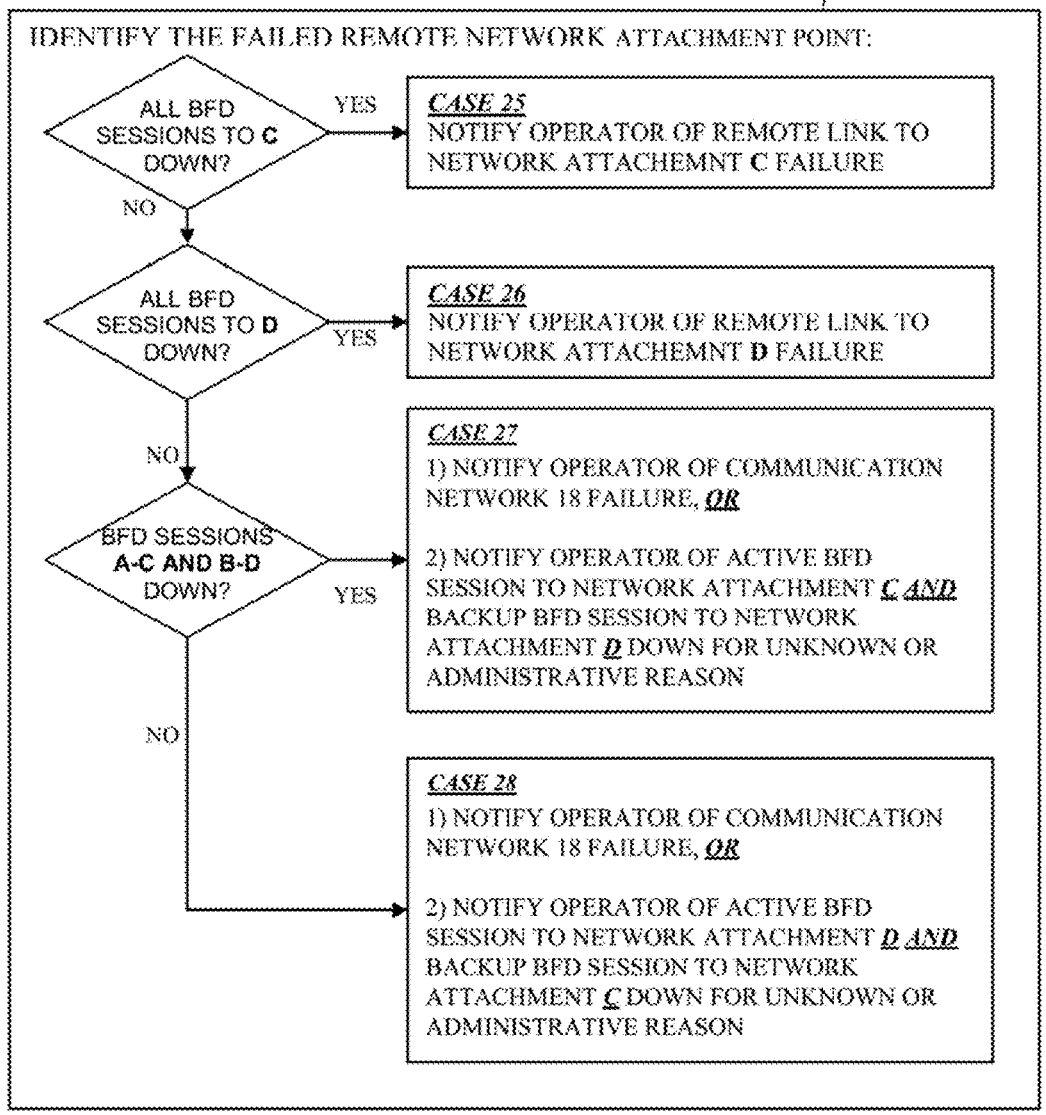

FIG. 9 introduces example details for the Block 126 processing of FIG. 6, which occurs when the local active-link sessions have mixed states, with one or more of them up and one or more of them down. In the continuing example, NODE1 has network attachment points A and B, and NODE2 has network attachment points C and D. Taking the perspective of NODE1, attachment points A and B are local and attachment points C and D are remote, and one may assume that the local network attachment point A is considered the primary or active network attachment point, and that, therefore, the BFD sessions 22 supported by the A-C and A-D pairings are active-link sessions, while the BFD sessions 22 supported by the B-C and B-D pairings are backup-link sessions.

FIG. 9 pertains to the circumstance where the connection failure detection processing of FIG. 6 indicates from the perspective of NODE1 that there is a mix of up and down local active-link sessions. For the A-C, A-D active links at issue in the example network topology this circumstance can be understood as either the A-C link or the A-D link being down.

Processing begins with determining whether all of the backup link sessions are up (Block 180). For the example topology of FIG. 5A, this step involves determining whether both the B-C and the B-D sessions are up. If so (YES from 180), processing continues with the processing designated as Box 9-1, which is shown in FIG. 9-1.

If not, (NO from 180), processing continues with determining whether all backup-link sessions are down (e.g., where the BFD status information 28 indicates that the BFD session 22 associated with the B-D pairing of local and remote network attachment points B and D is down and that the BFD session 22 associated with the B-C pairing of local and remote network attachment points B and C is down) (Block 182). If so (YES from 182), processing continues with the processing designated as Box 9-2, which is shown in FIG. 9-2. If not all backup-link sessions are down (NO from 182), processing continues with the processing designated as Box 9-3, which is shown in FIG. 9-3.

FIG. 9-1 illustrates example processing details for Box 9-1, for failure scenarios referred to as Scenario #8 and Scenario #9. In Scenario #8, the following BFD status information 28 applies for the A-C/A-D and B-CB-D connection pairings at issue in the continuing NODE1/NODE2 example: A-C UP, A-D DOWN, B-C UP, B-D UP. For Scenario #9, the following BFD session status information 28 applies: A-C DOWN, A-D UP, B-C UP, B-D UP. The processing of Block 184 includes Cases 18 and 19. Assuming that the A-C pairing of network attachment points at NODE1 and NODE2 represent the primary or active L3 communication path 24 between them, Case 18 applies if the A-C BFD session is down, and Case 19 applies if the A-C BFD session is not down—i.e., where the A-D BFD session is down.

FIG. 9-2 illustrates example processing for Box 9-2 in FIG. 9, and it pertains to Scenario #10 and #11. In Scenario #10, the following BFD status information 28 applies: A-C UP, A-D DOWN, B-C DOWN, and B-D DOWN. For Scenario #11, the following BFD status information 28 applies: A-C DOWN, A-D UP, B-C DOWN, and B-D DOWN. Thus, the two scenarios are distinguished by whether the A-C link or the A-D link is down.

The processing illustrated in FIG. 9-2 includes notifying the operator of the loss of redundancy arising from the L3 connection failure (Block 186), and continues with attempting to identify the apparent location of the failure, as either being a local backup link failure (Block 188) and at one of the remote network attachment points (Block 190) (which for the example processing would be determining whether the C or D attachment points at NODE2 appears to be down). The processing of Blocks 188 and 190 covers Cases 20-24, which are defined as illustrated in the drawing.

The processing illustrated in FIG. 9-3 provides example details for Box 9-3 in FIG. 9. It covers BFD status information Scenarios #12-#15. Scenario #12 pertains to the following BFD status information 28: A-C UP, A-D DOWN, B-C DOWN, and B-D UP. Scenario #13 pertains to the following BFD status information 28: A-C UP, A-D DOWN, B-C UP, and B-D DOWN. Scenario #14 pertains to the following BFD status information 28: A-C DOWN, A-D UP, B-C DOWN, and B-D UP. Scenario #15 pertains to the following BFD status information 28: A-C DOWN, A-D UP, B-C UP, and B-D DOWN.

As seen for the processing details in Block 192, these different scenarios map to respective ones among failure Cases 25-28. For example, if all BFD sessions supported by the remote network attachment point C are down, Case 25 applies. Alternatively, if all BFD sessions supported by the remote network attachment D are down, Case 26 applies. As a further alternative, if the A-C and B-D sessions are down, Case 27 applies. Finally, if none of the preceding conditions are met, Case 28 applies. The actions taken for each such case are as shown in the diagram.

As for interpreting the diagram, note that "REMOTE LINK TO NETWORK ATTACHMENT "X" FAILURE" means that the remote network attachment "X" (X=C or D) is unreachable due to either: (1) link X-DHX down, or (2) link DHX to communication network 18 down, or (3) DHX L3 issue.

FIGS. 10-1, 10-2, and 10-3 provide summary tables, showing example mapping between the various link failure scenarios and the corresponding failure processing cases. These tables can be understood in the context of the FIG. 5A network topology and the processing of FIGS. 6-9, including sub-figures.

Figure 11:
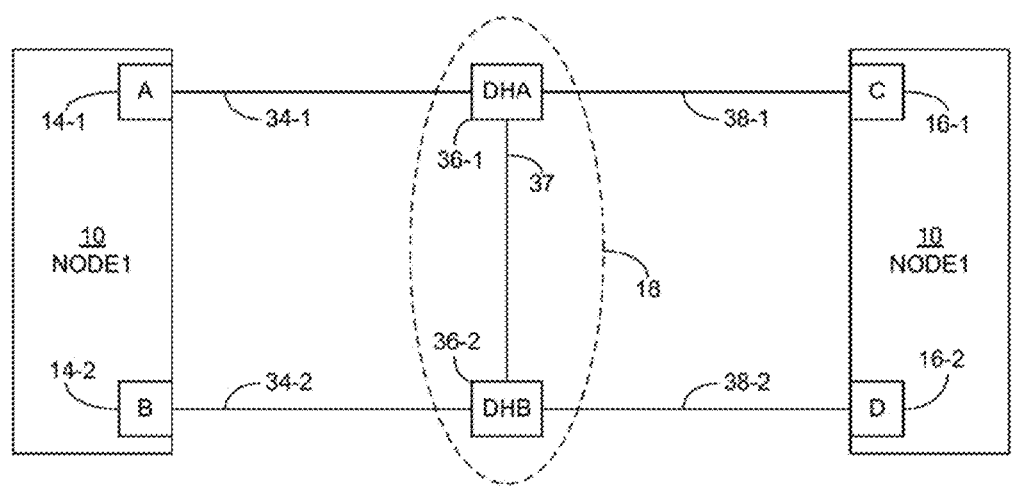
FIG. 11 is a block diagram of another example embodiment of local and remote host nodes interconnected directly, by a pair of next-hop routers functioning as dual-homed devices.

FIG. 11 introduces another topology, wherein a router 36-1 and a router 36-2 each provide a direct, next-hop connection between the local and remote host nodes 10 and 12. As with FIG. 5A/B, simplified referencing is used. Router 36-1 is referred to as DHA, indicating its role as a first dual-homed device interconnecting NODE1 and NODE2, and router 36-2 is referred to as DHB. If NODE1 is considered the local host node and NODE2 is considered the remote host node, then the network attachment points A and B at NODE1 are local network attachment points and the network attachment points C and D at NODE2 are the remote network attachment points. (The local/remote designations could be reversed, e.g., where the processing is considered from the perspective of NODE2 as the local host node. In that case, C and D would be the local network attachment points and A and B would be the remote network attachment points.)

In the diagram, there is a connection 34-1 between the NODE1 network attachment point A and DHA and a connection 34-2 between the NODE1 network attachment point B and DHB. Similar connections 38-1 and 38-2 link NODE2 network attachment points C and D to DHA and DHB, respectively. Thus, the following BFD sessions 22 are established: a BFD session from A to C; a BFD session from A to D; a BFD session from B to C; and a BFD session from B to D. As with two multi-attached dual-homed host nodes over an arbitrary network, a matrix of these four BFD statuses is obtained and used via a recovery algorithm to locate an L3 connection failure and determine the proper action in response. As a further note, there is a bridge connection 37 between DHA and DHB, and it will be understood that BFD sessions on the A-DHA-DHB-D path and on the B-DHB-DHA-C path will traverse the bridge connection 37. Therefore, for this example, there are two BFD sessions 22 which do not use the bridge connection 37 and two BFD sessions 22 which do use the bridge connection 37.

For this topology, one of the dual-homed host devices DHA or DHB is designated as the preferred or default device. This designation is considered when only one BFD session 22 from the active network attachment point and only one BFD session 22 from the backup network attachment point are up. In such a case, two scenarios are possible, depending on whether the active path did or did not include the bridge connection 37 for routing traffic. In this regard, one possible non-bridged L3 communication path 24 involves the A-DHA-C links. The other non-bridged L3 communication path 24 includes the B-DHB-D links. The bridged L3 communication paths 24 include a first path involving the A-DHA-DHB-D links and a second path involving the B-DHB-DHA-C links.

Figure 12:
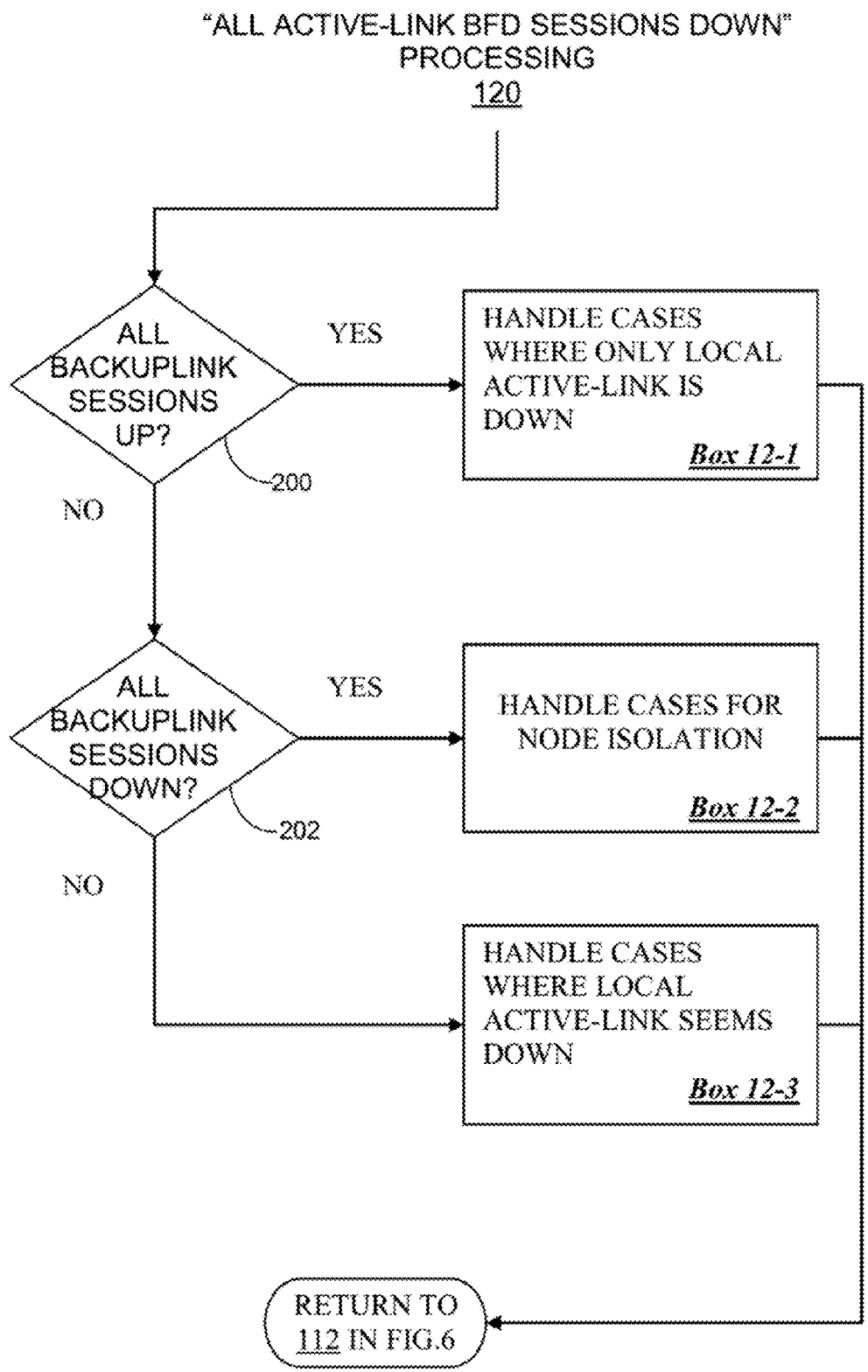
FIG. 12 and its associated
Figures 1, 12:
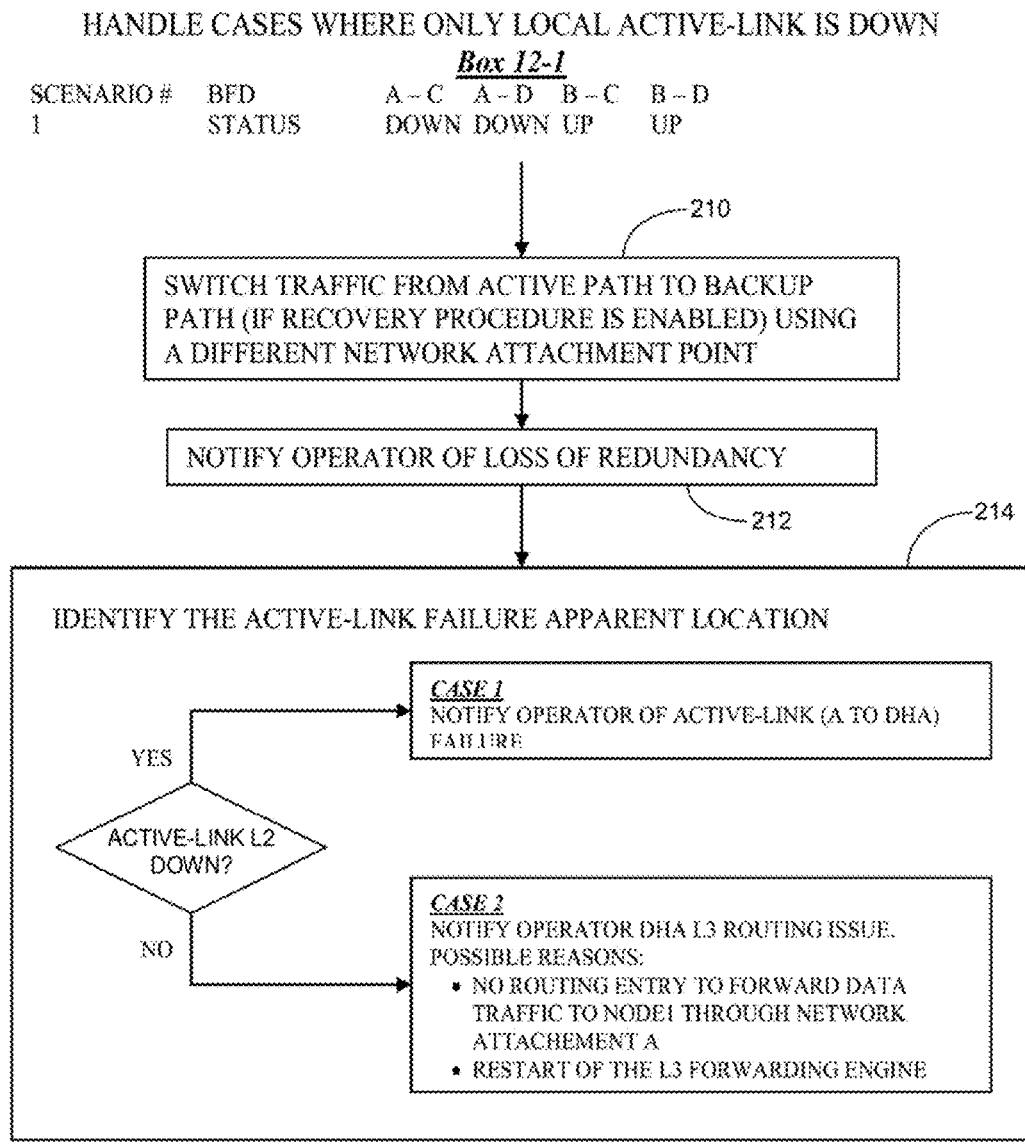
Figures 2, 12:
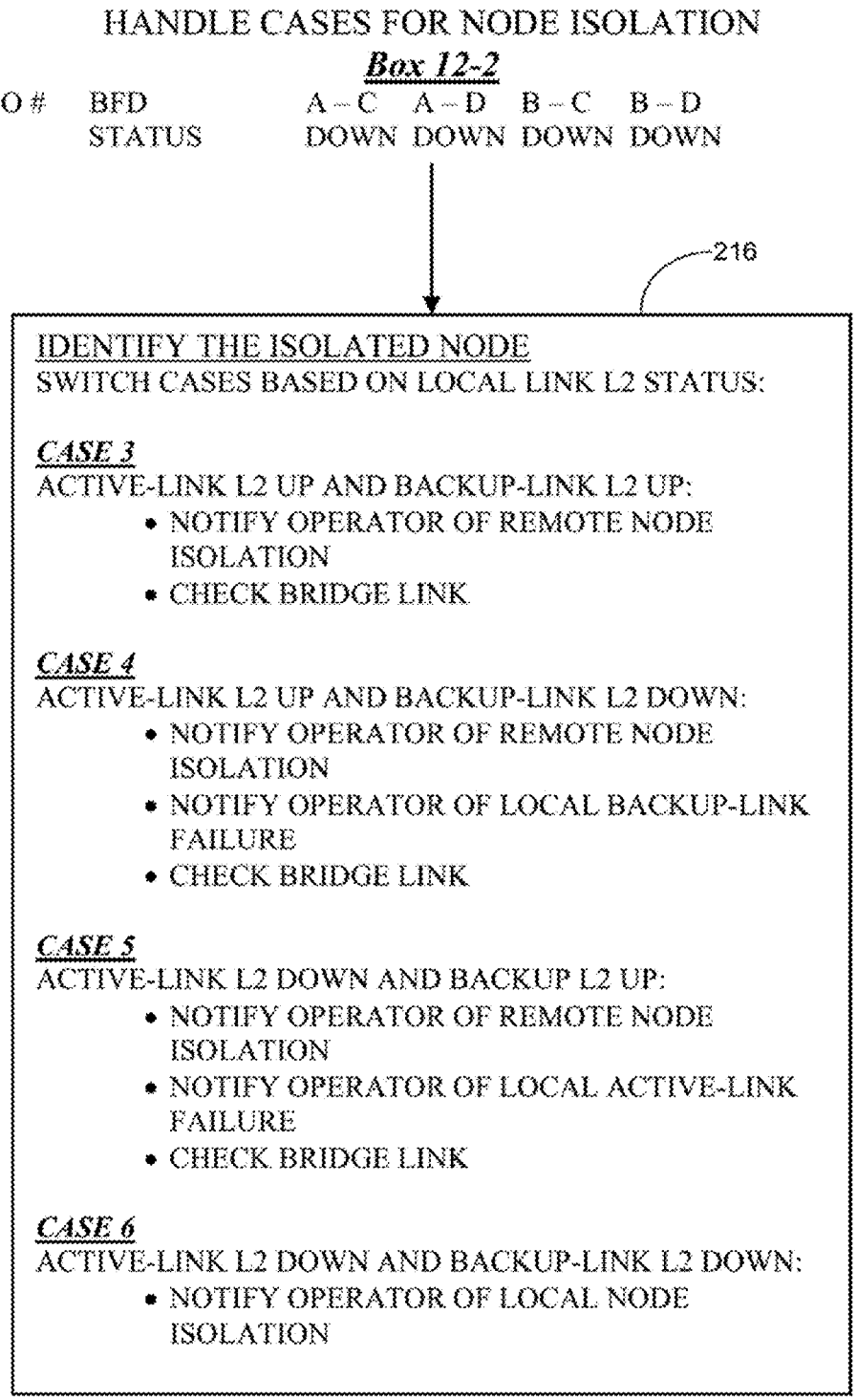
Figures 3, 12:
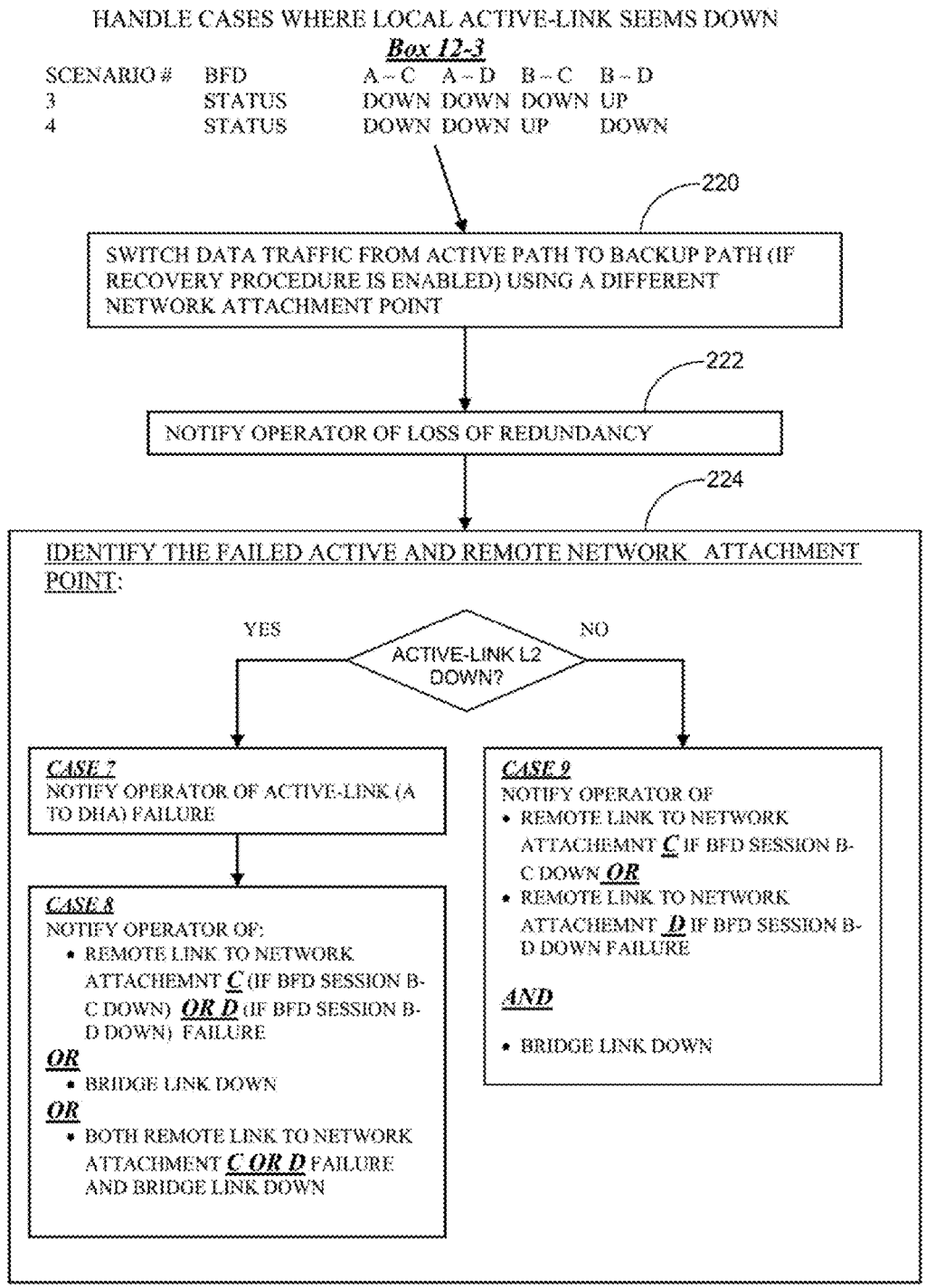

FIG. 12 relates to the top-level processing of FIG. 6 and presents processing in the context of the network topology shown in FIG. 11, for the "all active-link BFD sessions down" processing path of FIG. 6 (Block 120 in FIG. 6). The processing includes determining whether all backup-link BFD sessions are up (Block 200). If so (YES from Block 200), processing continues with Box 12-1, for the case(s) where only the local active link is down.

If not (NO from Block 200), processing continues with determining whether all backup-link sessions are down. If so (YES from Block 200), processing continues with Box 12-2, for handling the case(s) for isolation of the local host node, e.g., such cases involve the scenario where all active-link and all backup-link BFD sessions at the local host node are down.

It may be noted that the top-level processing example of FIG. 6 applies, but that the detailed processing breakouts of Blocks 120, 124, and 126 are adapted for the network topology of FIG. 11. In that regard, FIG. 12-1 provides processing details for an L3 connection failure in the context of FIG. 11, for Scenario #1, where the following BFD status information 28 applies: A-C DOWN, A-D DOWN, B-C UP, and B-D UP. Box 12-1 processing as shown in FIG. 12-1 includes switching traffic (e.g., user data and/or signaling) over from the active L3 communication path 24 to a backup L3 communication path 24 (Block 210). This processing is optional and is done in implementations in which the host node(s) are configured to undertake failure recovery processing responsive to detecting an L3 connection failure.

Processing continues with notifying the operator of the loss of redundancy (Block 212) and further continues with identifying the apparent location of the active-link failure (Block 214). Such processing includes Case 1 processing, where the local active-link L2 connection is down, or Case 2 processing, where the local active-link L2 connection is not down. Example details for such processing are as presented in the figure.

FIG. 12-2 illustrates example processing for Box 12-2 in FIG. 12. The illustrated processing pertains to Scenario #2, where the following BFD status information 28 applies: A-C DOWN, A-D DOWN, B-C DOWN, and B-D DOWN. In particular, the Box 12-2 processing pertains to handling node isolation cases, and includes determining whether the local host node or the remote host node appears to be isolated, based on the processing of Block 216. Such processing involves performing the failure-processing operations associated with a respective one of Cases 3-6. The particular failure case processing undertaking depends on the L2 link analyses detailed in the figure.

FIG. 12-3 illustrates example processing for Box 12-3 in FIG. 12. The illustrated processing pertains to Scenarios #3 and #4, where the following BFD status information 28 applies: A-C DOWN, A-D DOWN, B-C DOWN, and B-D UP, for Scenario #3; and A-C DOWN, A-D DOWN, B-C UP, and B-D DOWN, for Scenario #4. In particular, the Box 12-3 processing pertains to handling cases where the local active link seems to be down. Processing switching data traffic from the active L3 communication path 24 to a backup L3 communication path (assuming that such failure recovery is implemented at the local host node) (Block 220).

Processing continues with notifying the operator of the loss of redundancy (Block 222) and identifying the failed local active and remote network attachment points (Block 224). Such processing involves performing processing for failure Cases 7 and 8, or Case 9, in dependence on L2 link testing.

Figure 13:
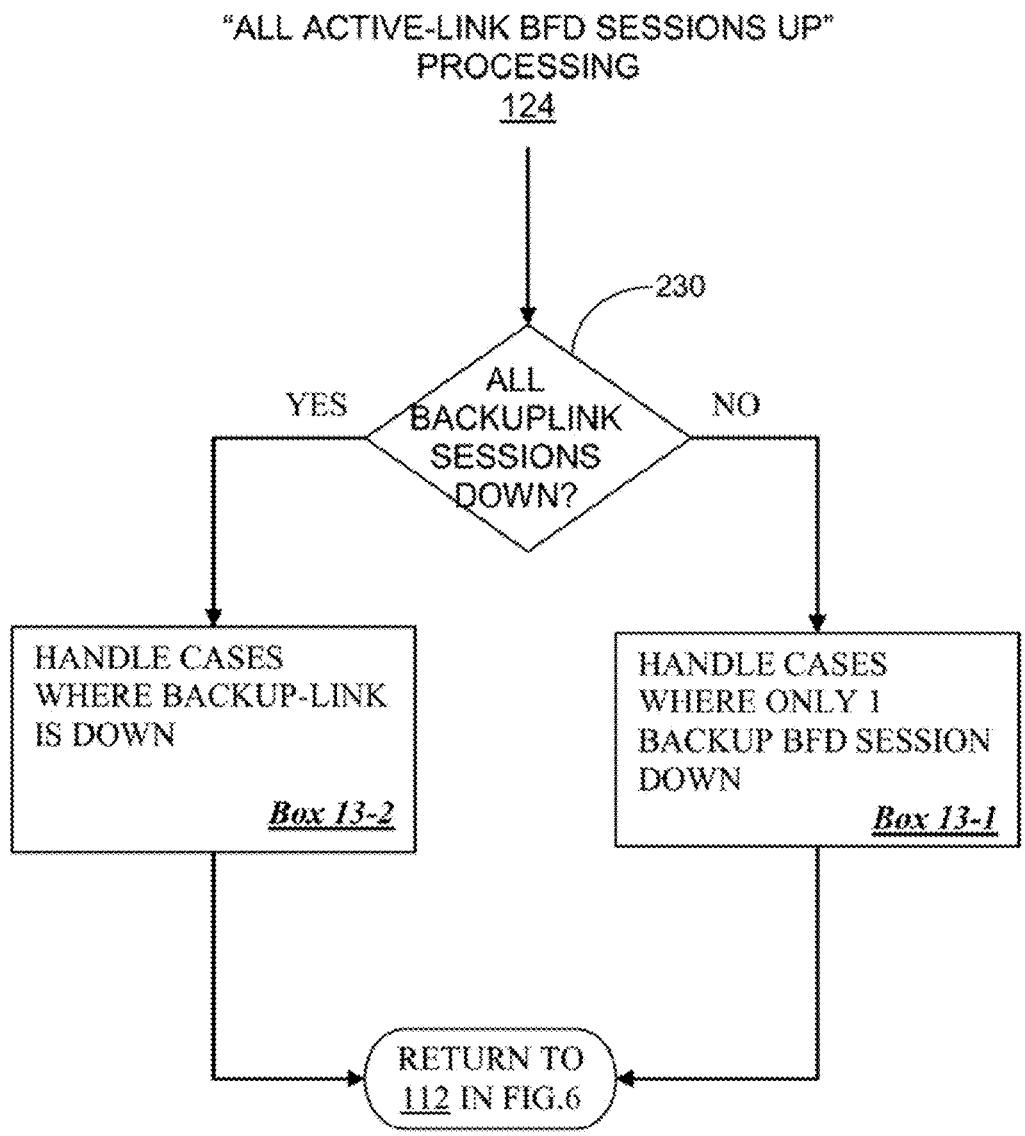
FIG. 13 and its associated
Figures 1, 13:
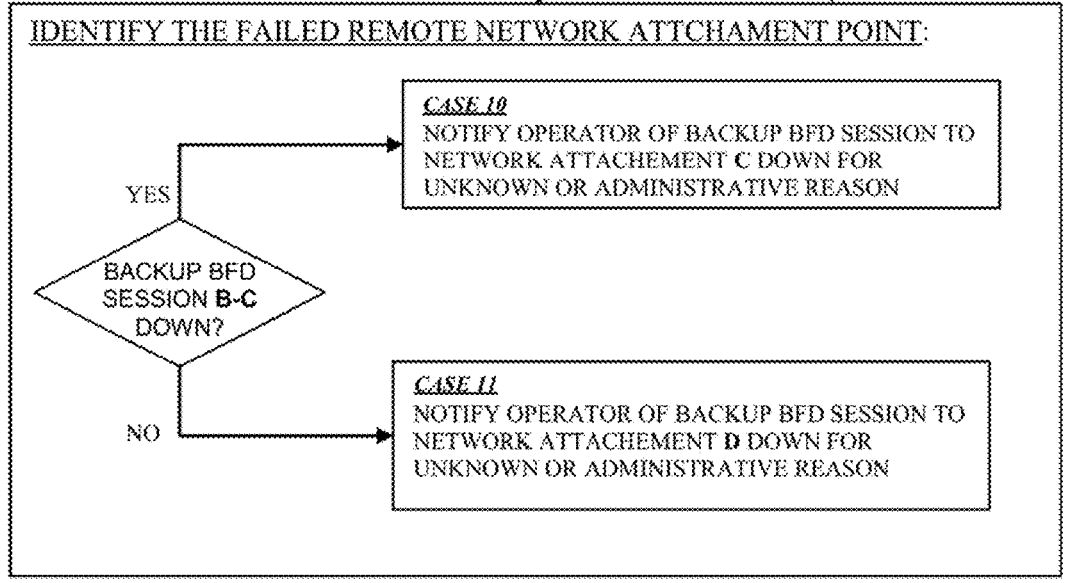
Figures 2, 13:
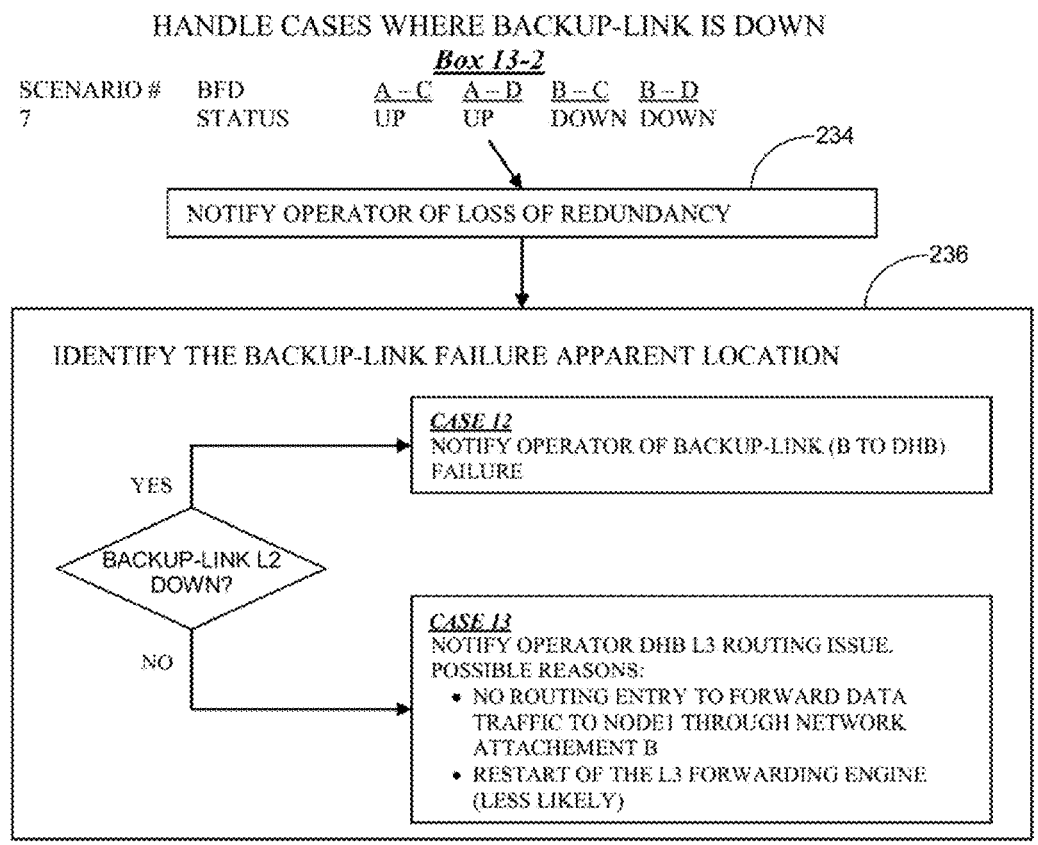

FIG. 13 illustrates processing in the context of the FIG. 11 network topology, for the "all active link sessions up" processing associated with Block 124 of FIG. 6. The illustrated processing includes determining whether all backup-link BFD sessions 24 are down (Block 230). If not (NO from 230), processing continues with Box 13-1 processing, which is detailed in FIG. 13-1. If so (YES from 230), processing continues with Box 13-2 processing, which is detailed in FIG. 13-2.

FIG. 13-1 provides examples details for Box 13-1 processing, and it pertains to Scenarios #5 and #6. Scenario #5 has the following BFD status information 28: A-C UP, A-D UP, B-C UP, and B-D DOWN. Scenario #6 has the following BFD status information 28: A-C UP, A-D UP, B-C DOWN, and B-D UP. In other words, the two scenarios differ in dependence on which remote network attachment point C or D is associated with a down BFD session.

Thus, Box 13-1 includes the processing of Block 232, which determines which remote network attachment point has failed. For the example of FIG. 11 and with NODE1 as the local node and NODE2 as the remote node, such processing amounts to identifying whether the failed BFD session is associated with the remote network attachment point C or D. One sees that such processing involves failure Case 10 processing, which is invoked if the B-C sessions down, and failure Case 11 processing, which is invoked if the B-D session is down.

FIG. 13-2 illustrates example Box 13-2 processing, pertaining to Scenario #7, where the following BFD status information 28 applies: A-C UP, A-D UP, B-C DOWN, and B-D down. In other words, Box 13-2 processing occurs when the local active-link sessions are both up (the BFD sessions 22 supported by the A-C and A-D network attachment point pairings), and the local backup-link sessions are both down (the BFD sessions 22 supported by the B-C and B-D network attachment point pairings).

Processing includes notifying the operator of the loss of redundancy (Block 234) and continues with identifying the apparent location of the backup link failure (Block 236). That processing depends on evaluating L2 connectivity for the backup link, and results in carrying out either failure Case 12 processing or failure Case 13 processing. Case 12 applies if the backup link is down at L2, and Case 13 applies if not.

Figure 14:
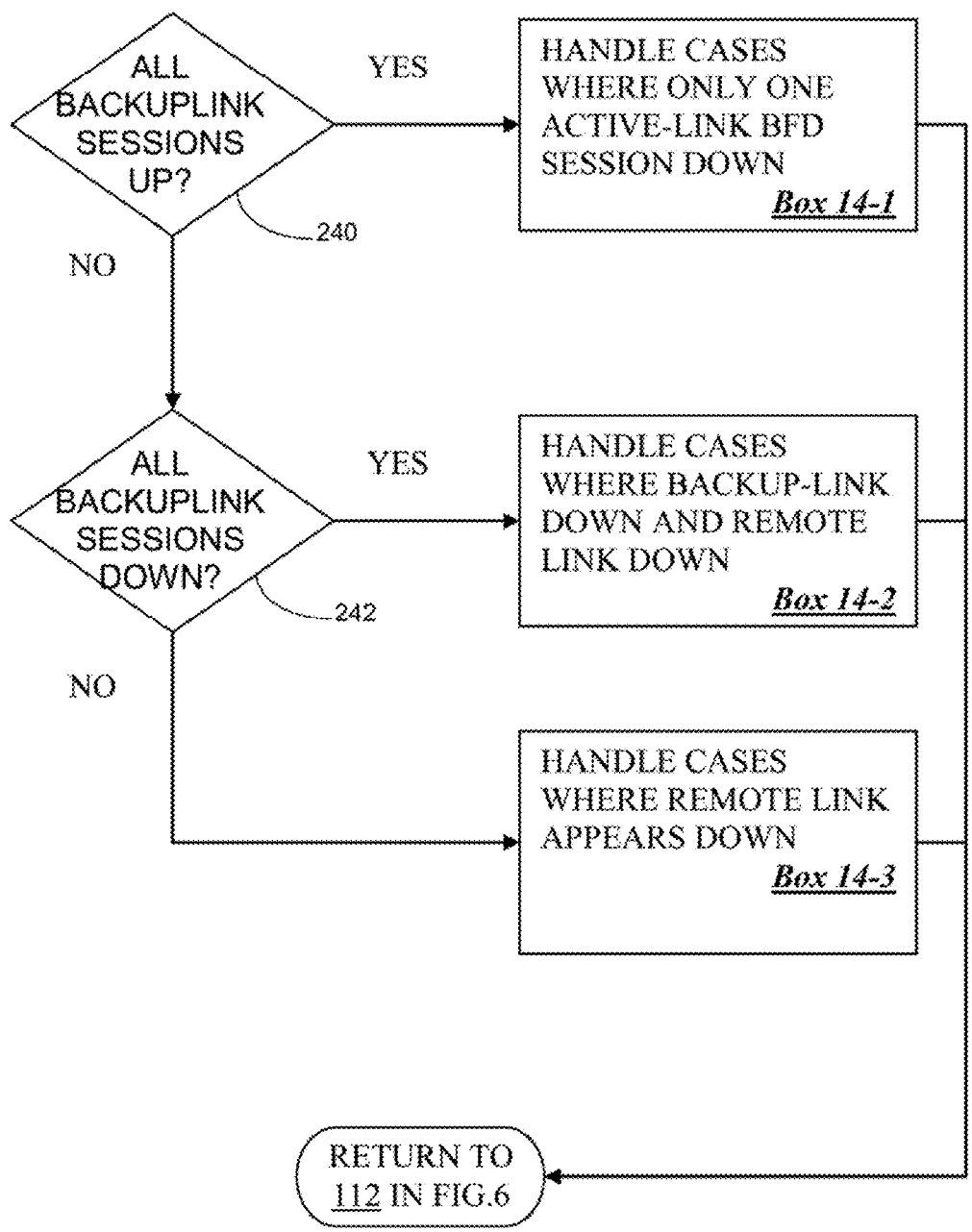
FIG. 14 and its associated
Figures 1, 14:
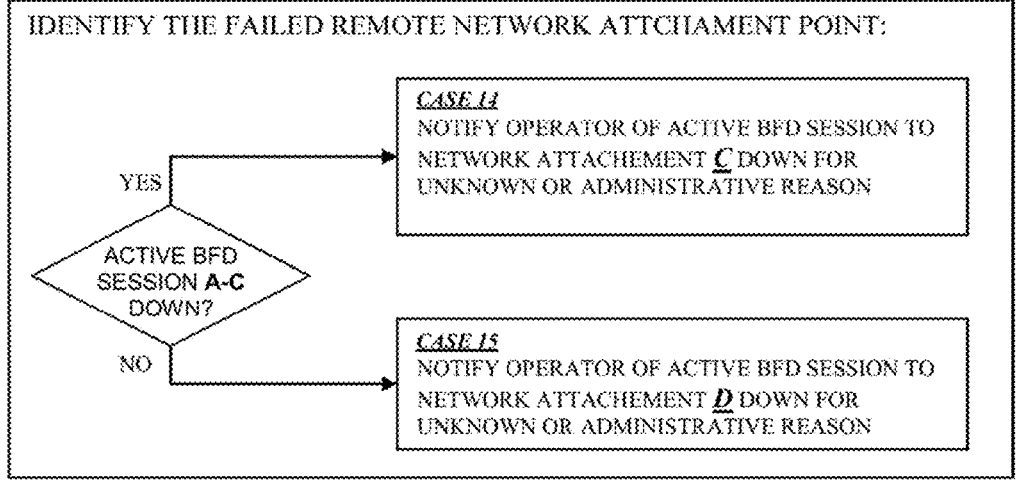
Figures 2, 14:
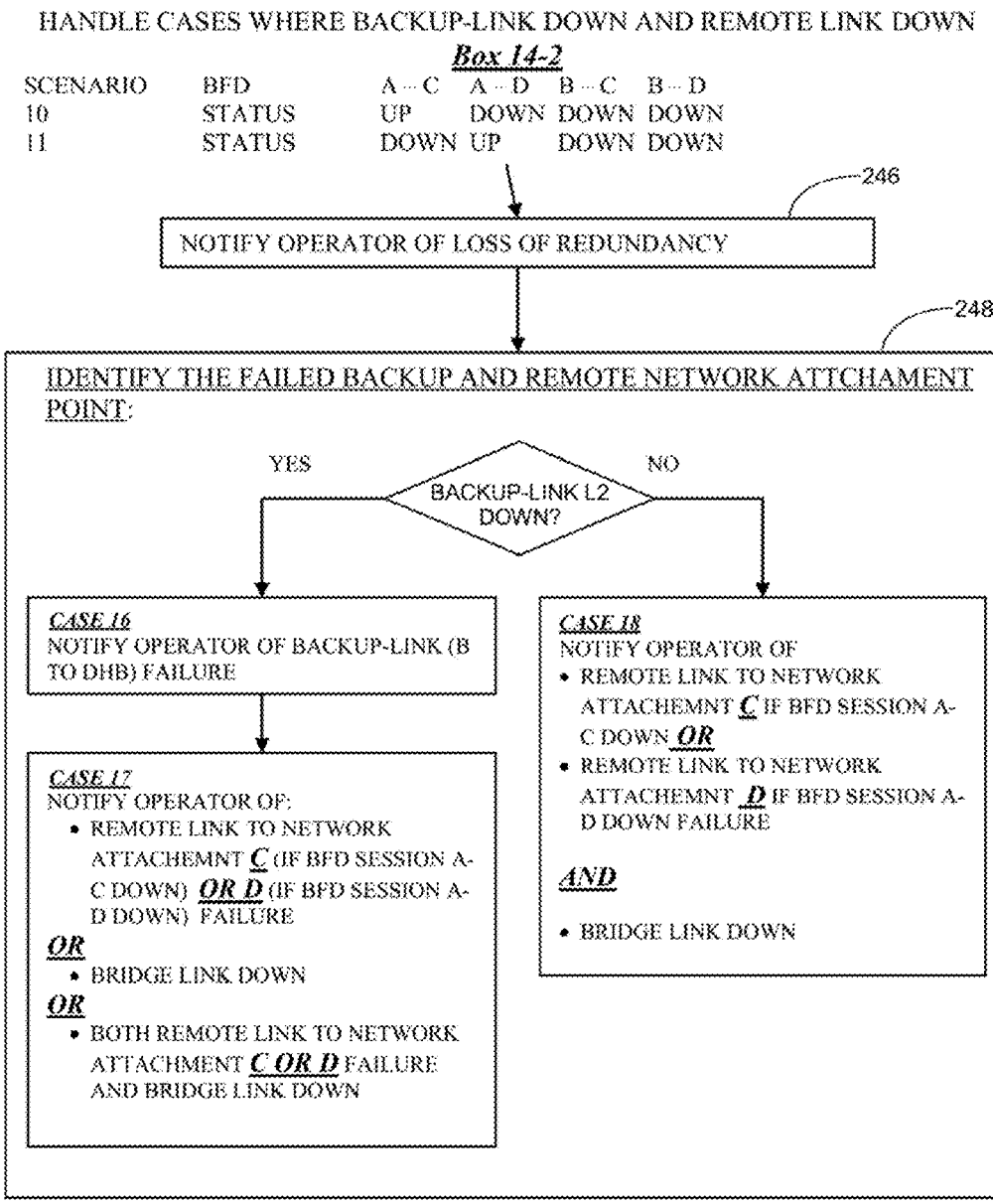
Figures 3, 14:
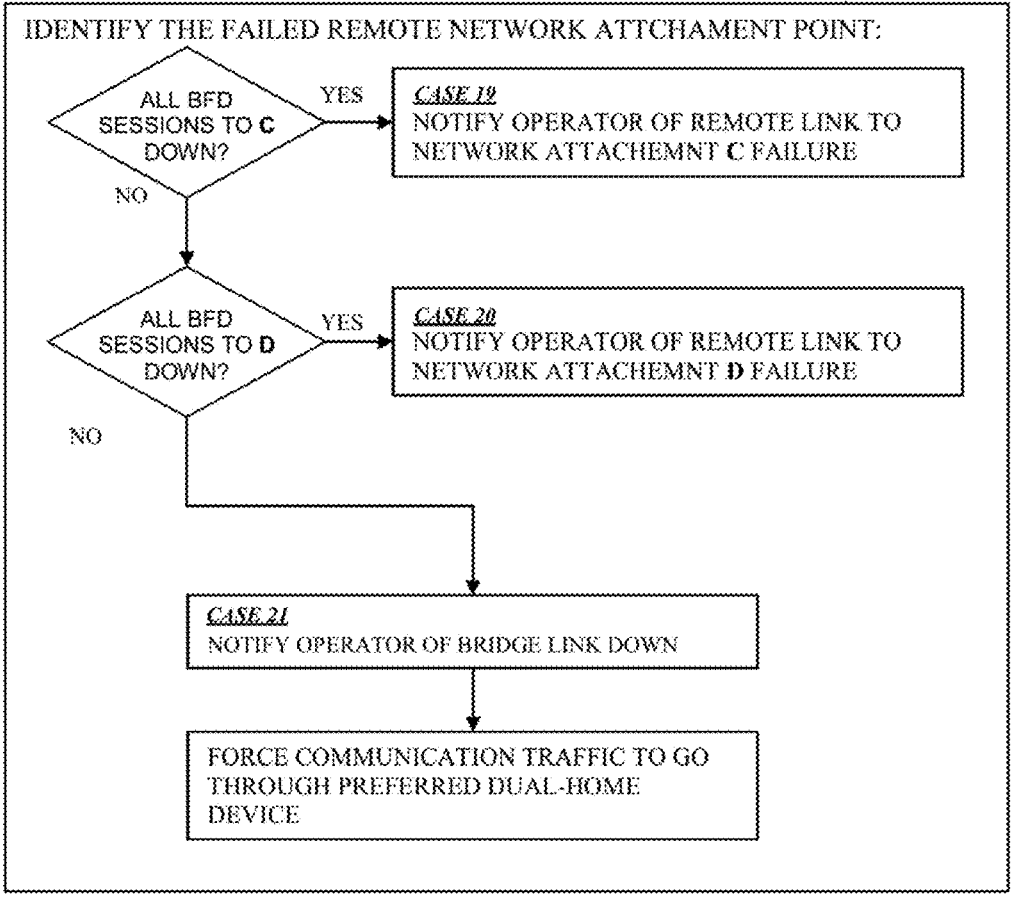

FIG. 14 applies to the "one active-link BFD session up" case of Block 126 in FIG. 6, for the network topology of FIG. 11. Processing "begins" with determining whether all backup-link sessions are up (Block 240). If so (YES from 240), then processing continues with Box 14-1 processing, which is illustrated in FIG. 14-1. If not (NO from 240) processing continues with determining whether all backup-link sessions are down (Block 242). If so (YES from 242), processing continues with Box 14-2 processing, which is illustrated in FIG. 14-2. If not (NO from 242), processing continues with Box 14-3 processing, which is illustrated in FIG. 14-3.

FIG. 14-1 illustrates example Box 14-1 processing, which pertains to Scenarios #8 and #9. Scenario #8 has the following BFD status information 28: A-C UP, A-D DOWN, B-C UP, and B-D UP. Scenario #9 has the following BFD session status information 28: A-C DOWN, A-D UP, B-C UP, and B-D UP. In other words, the two scenarios are distinguished as a function of which active-link session is down, A-C or A-D, when both backup-link sessions are up.

As such, the processing of Block 244 focuses on determining which remote attachment point has failed, C or D. This determination is made based on evaluating whether the A-C or A-D session is down. If the A-C session is down, failure Case 14 processing applies, and if the A-D session is down, failure Case 15 processing applies.

FIG. 14-2 illustrates example Box 14-2 processing, which pertains to Scenarios #10 and #11. Scenario #10 has the following BFD status information 28: A-C UP, A-D DOWN, B-C DOWN, and B-D DOWN. Scenario #11 has the following BFD session status information 28: A-C DOWN, A-D UP, B-C DOWN, and B-D DOWN. In other words, the two scenarios are distinguished as a function of which active-link session is down, A-C or A-D, when both backup-link sessions are down.

The illustrated Box 14-2 processing includes notifying the operator of the loss of redundancy (Block 246), and continues with identifying the failed local backup link and remote network attachment points (Block 248). Such processing involves performing failure Cases 16 and 17 or failure Case 18, in dependence on whether the local backup L2 link is down.

FIG. 14-3 illustrates example Box 14-3 processing, which pertains to cases where the remote link appears to be down. Such processing covers Scenarios #12-#15. Scenario #12 has the following BFD status information 28: A-C UP, A-D DOWN, B-C DOWN, and B-D UP. Scenario #13 has the following BFD status information 28: A-C UP, A-D DOWN, B-C UP, and B-D DOWN. Scenario #14 has the following BFD status information 28: A-C DOWN, A-D UP, B-C DOWN, and B-D UP. Scenario #15 has the following BFD status information 28: A-C DOWN, A-D UP, B-C UP, and B-D DOWN.

The processing of Block 250 focuses on identifying the failed remote network attachment point—i.e., for the network topology of FIG. 11, such processing identifies whether the C or D network attachment point at the remote host node (NODE2) appears to have failed. Such processing involves determining whether all BFD sessions to attachment point C are down. If so, processing continues with failure Case 19 processing. If not, processing continues with determining whether all BFD sessions to attachment point D are down. If so, processing continues with failure Case 20 processing. If neither situation pertains, then processing continues with failure Case 21 processing.

FIGS. 15A, B, and C provides use-case examples that map to the case numbers in FIGS. 12-14. Note that FIGS. 15A-C represent a single, continuous table, meaning that the column headers shown in FIG. 15A apply to the columns of FIGS. 15B and 15C.

Whether in the context of FIG. 1, or in the more detailed contexts of FIG. 5A/B and FIGS. 6-10 or FIG. 11 and the corresponding processing of FIGS. 12-15, the present invention makes advantageous use of the BFD session protocol, which provides fast L3 connection failure detection, thus minimizing "black-holing" of traffic, wherein traffic directed to failed connection links may be lost during the time it takes to detect the failure and switch over to a good link. In particular, though, the present invention exploits the BFD session protocol in a manner that enables determination of the location of an L3 connection failure. In a generalized sense, knowledge of the network topology at issue and the pattern of up and down state indications for all BFD sessions corresponding to all possible combinations of local and remote network attachment points between two host nodes are used to pinpoint the location of L3 connection failures. Further non-limiting example advantages include reduced debugging cost, because of the ability to pinpoint connection failure locations and the attendant ability to provide the network operator with pinpoint location information regarding detected failures.

Thus, one aspect of the present invention is to address connection monitoring and failure recovery processing when dealing with L3 connections between two or more multi-attached host nodes (which nodes also may be dual-homed), using the BFD multi-hop detection technique in conjunction with the knowledge of the network topology (multi-attached dual-homed topology). In this regard, the present invention defines algorithms for fast connection failure detection and recovery of any L3 connection failure between two host nodes or other endpoints. In one example embodiment, the two endpoints are interconnected through an arbitrary reliable IP network; and in another example embodiment, the endpoints are directly connected via a common pair of next-hop routers. In either case, the present invention provides for fast (sub one-second) failure detection and location determination, which provides for robust recovery solutions, improved failure recovery times, and lowered failure diagnostic and repair costs, and with minimal impact on the traffic (as long as there is an active physical or logical path between the two involved endpoints).

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Further, although specific terms may be employed herein, unless noted they are used in a generic and descriptive sense only and not for purposes of limitation.

What is claimed is:

1. A method at a local host node of locating Layer-3 (L3) connection failures involving a remote host node that is linked to the local host node via multiple L3 communication paths defined by unique pairings of multiple local network attachment points at the local host node and multiple remote network attachment points at the remote host node, said method comprising:
    establishing a Bidirectional Forwarding Detection (BFD) session for each of the L3 communication paths, wherein a network topology uniquely pairs at least one of the local network attachment points with more than one of the remote network attachment points such that said at least one of the local network attachment points is common to two or more of the L3 communication paths between the local and remote host nodes;
    monitoring BFD status information for each BFD session (22) that indicates whether the BFD session is up or down;
    detecting an L3 connection failure based on determining that at least one of the BFD sessions is down;
    determining an apparent location of the L3 connection failure by analyzing the pattern of up and down indications in the BFD status information in conjunction with knowledge of the network topology
    determining from the BFD status information whether the L3 connection failure has taken down an active one of the L3 communication paths and, if so, switching communications traffic from the active L3 communication path to a backup one of the L3 communication paths;
    wherein, in the case that the BFD status information indicates that the L3 connection failure has taken down a backup L3 communication path but not the active L3 communication path, leaving the communications traffic on the active L3 communication path and raising a low-priority alarm to indicate the L3 connection failure and corresponding loss of path redundancy.

2. The method of claim 1, wherein determining the apparent location of the L3 connection failure comprises pinpointing from the pattern of up and down indications whether the L3 connection failure appears to be associated with a local communication link involving one of the local network attachment points, or with a remote communication link involving one of the remote network attachment points, or with the communication network.

3. The method of claim 2, wherein said pinpointing comprises determining that not all of the L3 communication paths are down, and further determining whether a particular one of the local or remote network attachment points is common to all of the L3 communication paths having BFD sessions that are down and, if so, identifying the local or remote communication link for that particular local or remote network attachment point as the apparent location of the L3 connection failure.

4. The method of claim 2, wherein said pinpointing comprises determining that all BFD sessions are down and correspondingly identifying the communication network as the apparent location of the L3 connection failure.

5. The method of claim 1, further comprising raising a high-priority alarm to indicate the L3 connection failure.

6. The method of claim 1, wherein only one of the L3 communication paths is active at any given time, and wherein the method includes determining from the BFD status information whether the L3 connection failure has taken the active L3 communication path down and, if so, performing at least one of: raising a high-priority alarm; and initiating a failure recovery mechanism that makes another one of the L3 communication paths the active L3 communication path.

7. The method of claim 1, further comprising determining that all BFD sessions associated with an active one of the local network attachment points are down and in response switching communications traffic from the active local network attachment point to a backup one of the remaining local network attachment points, conditioned on said backup local network attachment point being associated with at least one BFD session that is up.

8. The method of claim 1, wherein the network topology provides a multi-hop L3 communication path between each local network attachment point and every one of the remote network attachment points such that the number of L3 communication paths between the local and remote host nodes through the communication network comprises the number of all unique pairings of local and remote network attachment points, and wherein establishing the BFD sessions comprises establishing a BFD session for each said unique pairing, and determining the apparent location of the L3 connection failure is based on identifying which unique pairings are common among the BFD sessions that are indicated by the BFD status information as being down.

9. The method of claim 8, wherein one of the local network attachment points is an active attachment point associated with an active one of the L3 communication paths and one or more backup ones of the L3 communication paths, and the remaining local network attachment points are backup attachment points associated only with backup L3 communication paths, and wherein the method includes initiating a recovery mechanism to switch communications traffic from the active attachment point to one of the backup attachment points responsive to detecting that all BFD sessions associated with the active attachment point are down.

10. A local host node configured to locate Layer-3 (L3) connection failures involving a remote host node that is linked to the local host node via multiple L3 communication paths defined by unique pairings of multiple local network attachment points at the local host node and multiple remote network attachment points at the remote host node, wherein the local host node comprises:
two or more of said local network attachment points, each configured for attaching the local host node to the communication network;
a Bidirectional Forwarding Detection (BFD) session processor configured to establish a BFD session for each of the L3 communication paths, wherein a network topology uniquely pairs at least one of the local attachment points with more than one of the remote network attachment points such that said at least one of the local network attachment points is common to two or more of the L3 communication paths between the local and remote host nodes, and wherein said BFD session processor is further configured to maintain BFD status information for each BFD session that indicates whether the BFD session is up or down;
a failure processor configured to detect an L3 connection failure based on determining that at least one of the BFD sessions is down, and determine an apparent location of the L3 connection failure by analyzing the pattern of up and down indications in the BFD status information in conjunction with knowledge of the network topology
wherein the failure processor is configured to determine from the BFD status information whether the L3 connection failure has taken down an active one of the L3 communication paths (24) and, if so, to initiate switching of communications traffic from the active L3 communication path to a backup one of the L3 communication paths and
wherein, in the case that the BFD status information indicates that the L3 connection failure has taken down a backup L3 communication path but not the active L3 communication path, the failure processor is configured to raise a low-priority alarm to indicate the L3 connection failure and corresponding loss of path redundancy.

11. The local host node of claim 10, wherein the failure processor is configured to determine the apparent location of the L3 connection failure based on being configured to pinpoint from the pattern of up and down indications whether the L3 connection failure appears to be associated with a local communication link involving one of the local network attachment points, or with a remote communication link involving one of the remote network attachment points, or with the communication network.

12. The local host node of claim 11, wherein the failure processor is configured to pinpoint the L3 connection failure based on being configured to recognize from the BFD status information that not all of the L3 communication paths are down, and to correspondingly determine whether a particular one of the local or remote network attachment points is common to all L3 communication paths that are down and, if so, to identify the local or remote communication link for that particular local or remote network attachment point as the apparent location of the L3 connection failure.

13. The local host node of claim 11, wherein the failure processor is configured to pinpoint the L3 connection failure based on being configured to recognize from the BFD status information that all BFD sessions are down and to correspondingly identify the communication network as the apparent location of the L3 connection failure.

14. The local host node of claim 10, wherein the failure processor is configured to initiate a high-priority alarm to indicate the L3 connection failure.

15. The local host node of claim 10, wherein only one of the L3 communication paths among the set of all possible L3 communication paths is active at any given time, and wherein the failure processor is configured to determine from the BFD status information whether the L3 connection failure has taken the active L3 communication path down and, if so, to perform at least one of: initiating a high-priority alarm; and initiating a failure recovery mechanism that makes another one of the L3 communication paths the active L3 communication path.

16. The local host node of claim 10, wherein the failure processor is configured to determine that all BFD sessions associated with an active one of the local network attachment points are down and in response to switch communications traffic from the active local network attachment point to a backup one of the remaining local network attachment points, conditioned on said backup local network attachment point being associated with at least one BFD session that is up.

17. The local host node of claim 10, wherein the network topology provides a multi-hop L3 communication path between each local network attachment point and every one of the remote network attachment points such that the number of L3 communication paths between the local and remote host nodes through the communication network comprises the number of all unique pairings of local and remote network attachment points, and wherein the BFD session processor is configured to establish a BFD session for each said unique pairing, and wherein said failure processor is configured to pinpoint the apparent location of the L3 connection failure based in part on identifying which unique pairings are common among the BFD sessions that are indicated by the BFD status information as being down.

18. The local host node of claim 17, wherein one of the local network attachment points is an active attachment point associated with an active one of the L3 communication paths and one or more backup ones of the L3 communication paths, and the remaining local network attachment points are backup attachment points associated only with backup L3 communication paths, and wherein the failure processor is configured to initiate a recovery mechanism to switch communications traffic from the active attachment point to one of the backup attachment points responsive to detecting that all BFD sessions associated with the active attachment point are down.

\* \* \* \* \*